United States Patent
Hosoi et al.

(10) Patent No.: US 10,720,811 B2
(45) Date of Patent: Jul. 21, 2020

(54) ELECTRIC MOTOR FOR VEHICLE, ELECTRIC MOTOR BEARING HOLDER TUBE PART WITH WATER DRAIN STRUCTURE CONCAVE RECESSED PARTS

(71) Applicant: Mitsuba Corporation, Gunma (JP)

(72) Inventors: Keiichi Hosoi, Kiryu (JP); Shuichi Tsujiyama, Kiryu (JP); Mikio Kawamura, Kiryu (JP); Shingo Watanabe, Kiryu (JP); Hiroki Masuyama, Kiryu (JP); Takeshi Tonegawa, Kiryu (JP); Minoru Ota, Kiryu (JP)

(73) Assignee: Mitsuba Corporation, Gunma (JP)

( * ) Notice: Subject to any disclaimer, the term of this patent is extended or adjusted under 35 U.S.C. 154(b) by 394 days.

(21) Appl. No.: 15/546,143

(22) PCT Filed: May 27, 2016

(86) PCT No.: PCT/JP2016/065732
§ 371 (c)(1),
(2) Date: Jul. 25, 2017

(87) PCT Pub. No.: WO2016/203929
PCT Pub. Date: Dec. 22, 2016

(65) Prior Publication Data
US 2018/0019635 A1    Jan. 18, 2018

(30) Foreign Application Priority Data
Jun. 17, 2015    (JP) .................................. 2015-122044

(51) Int. Cl.
*H02K 5/10*    (2006.01)
*H02K 1/18*    (2006.01)
(Continued)

(52) U.S. Cl.
CPC ............... *H02K 5/10* (2013.01); *H02K 1/187* (2013.01); *H02K 5/161* (2013.01); *H02K 21/22* (2013.01);
(Continued)

(58) Field of Classification Search
CPC .......... H02K 5/225; H02K 5/10; H02K 5/128; H02K 2205/09; H02K 7/14; H02K 11/00;
(Continued)

(56) References Cited

U.S. PATENT DOCUMENTS 2,323,146 A * 6/1943 Manney .................... H02K 9/24
310/88
5,006,742 A * 4/1991 Strobl ....................... H02K 5/10
310/43
(Continued)

FOREIGN PATENT DOCUMENTS

| JP | 2012095402 A | 5/2012 |
| JP | 2012145010 A | 8/2012 |
| JP | 2014108030 A | 6/2014 |

OTHER PUBLICATIONS

Chinese Patent Office, Office Action issued in corresponding CN 201680006633.0 dated Nov. 2, 2018, 7 pages.
(Continued)

*Primary Examiner* — Maged M Almawri
(74) *Attorney, Agent, or Firm* — Wood Herron & Evans LLP

(57) ABSTRACT

An electric motor for vehicle including a stator; a stator support member; a rotation shaft; a rotor including a bottom wall and a peripheral wall, in which the peripheral wall is provided with a magnet and the bottom wall is configured to be combined with the rotation shaft; and a bearing holder including a tube part, and a water drip hole is formed on a vertically lower side of the tube part, the stator support
(Continued)

member being provided with a bearing holder insertion part including a boss part into which the tube part is configured to be inserted, wherein a water drain structure configured to drain a water drop from the water drip hole is provided along a circumferential direction of an inner circumferential surface of the boss part in a vertically lower area of the inner circumferential surface of the boss part.

7 Claims, 12 Drawing Sheets

(51) Int. Cl.
*H02K 5/16* (2006.01)
*H02K 21/22* (2006.01)
*F01P 5/04* (2006.01)

(52) U.S. Cl.
CPC ........... *F01P 5/04* (2013.01); *F01P 2005/046* (2013.01); *H02K 2205/09* (2013.01)

(58) Field of Classification Search
CPC ......... H02K 11/33; F01D 25/30; F01D 25/32; F04D 1/00; F04D 13/0606; F04D 13/0626
USPC ....................................... 310/88, 87, 89, 239
See application file for complete search history.

(56) References Cited

U.S. PATENT DOCUMENTS

| | | | | |
|---|---|---|---|---|
| 5,010,265 | A * | 4/1991 | Tanaka | F02N 15/00 310/88 |
| 5,077,503 | A * | 12/1991 | Tamura | H02K 5/10 310/88 |
| 5,767,596 | A * | 6/1998 | Stark | H02K 5/00 29/596 |
| 5,872,410 | A * | 2/1999 | Sudoff | H02K 5/225 310/68 R |
| 6,107,708 | A * | 8/2000 | Yamaguchi | B60H 1/00457 310/58 |
| 6,371,167 | B1 * | 4/2002 | Hosoya | F16L 9/19 138/177 |
| 7,067,946 | B2 * | 6/2006 | Noda | F04D 25/082 310/52 |
| 7,898,126 | B2 * | 3/2011 | Kato | H02K 9/06 310/52 |
| 8,128,438 | B2 * | 3/2012 | Bernard | H01R 13/5227 439/701 |
| 8,425,205 | B2 * | 4/2013 | Li | F04D 29/445 417/295 |
| 8,562,313 | B2 * | 10/2013 | Andersen | H02K 3/50 29/596 |
| 9,246,367 | B2 * | 1/2016 | Ohashi | H02K 5/04 |
| 2003/0102740 | A1 * | 6/2003 | Marioni | H02K 5/10 310/87 |
| 2004/0263009 | A1 * | 12/2004 | Noda | F04D 25/082 310/71 |
| 2008/0284265 | A1 * | 11/2008 | Chaohai | H02K 5/10 310/89 |
| 2010/0111729 | A1 * | 5/2010 | Andersen | H02K 3/50 417/423.7 |
| 2012/0013212 | A1 * | 1/2012 | Vadillo | H02K 5/10 310/88 |

OTHER PUBLICATIONS

PCT Office, International Search Report issued in PCT/JP2016/065732 dated Aug. 23, 2016, 2 pages.

* cited by examiner

ELECTRIC MOTOR FOR VEHICLE, ELECTRIC MOTOR BEARING HOLDER TUBE PART WITH WATER DRAIN STRUCTURE CONCAVE RECESSED PARTS

TECHNICAL FIELD

The present invention relates to an electric motor for vehicle.

Priority is claimed on Japanese Patent Application No. 2015-122044, filed on Jun. 17, 2015, the contents of which are incorporated herein by reference.

BACKGROUND ART

Conventionally, as an electric motor used for vehicle such as automobiles, for example, there is a motor disclosed in the Patent Literature 1. This includes a stator around which coil is wound, a stator support member configured to support the stator, a rotation shaft rotatably supported by the stator support member via a bearing and extends in a horizontal direction and a rotor configured to be in a cylinder-like shape so as to cover the stator, in which a peripheral wall part thereof is provided with a magnet, and a bottom wall part is configured to be integrally-rotatably combined with the rotation shaft. In the Patent Literature 1, in order to easily drain a water drop infiltrated inside toward outside, a water drip structure is provided in a vertically lower area of a stator fixing pipe of a cylinder-like shape extending along a rotation shaft so that the water drop from the water drip structure is drained toward outside along a stator support member.

On the other hand, in recent years, enhancement of layout characteristic at a time of attaching an electric motor for vehicle to a vehicle, enhancement of connecting operability with an external connector of a vehicle or the like is desired. For example, an attachment angle to a vehicle around a rotation shaft of an electric motor for vehicle is desired to be flexibly adjustable.

PRIOR ART DOCUMENTS

Patent Documents

Japanese Patent Application, Publication No. 2012-95402

SUMMARY OF INVENTION

Problems to be Solved by the Invention

In the electric motor for vehicle in the Patent Literature 1, the water drip structure corresponds with only a predetermined attachment angle. That is why, there is a problem in which a quality of the water drip structure of the electric motor for vehicle is diminished when the attachment angle of the electric motor for vehicle to a vehicle is changed for such reasons as layout characteristic to the vehicle or connecting operability with external connector of the vehicle.

The present invention is an electric motor for vehicle provided with a water drain structure to drain a water drip infiltrated inside toward outside to enhance layout characteristic at a time of attaching and connecting operability with an external connector of a vehicle without diminishing the quality of the water drain structure.

Means for Solving the Problems

As a means for solving the problem described above, an aspect of the invention is an electric motor for vehicle including a stator around which coil is wound; a stator support member configured to support the stator; a rotation shaft rotatably supported by the stator support member via a bearing and extends in a horizontal direction; a rotor including a bottom wall of a disc-like shape that covers one side of the stator in an axial line direction of the rotation shaft and a peripheral wall of a cylinder-like shape that rises from an outer circumferential end of the bottom wall and covers an outer circumferential side of the stator, in which the peripheral wall is provided with a magnet and the bottom wall is configured to be integrally-rotatably combined with the rotation shaft; and a bearing holder including a tube part of a cylinder-like shape configured to support the bearing in an inner circumferential side thereof, and a water drip hole is formed on a vertically lower side of the tube part, the stator support member being provided with a bearing holder insertion part including a boss part of a cylinder-like shape into which the tube part is configured to be inserted, wherein a water drain structure configured to drain a water drop from the water drip hole toward outside is provided along a circumferential direction of an inner circumferential surface of the boss part in a vertically lower area of the inner circumferential surface of the boss part.

An aspect of the invention is the electric motor for vehicle wherein the water drain structure is a plurality of concave parts recessed from the inner circumferential surface of the boss part toward outside in a radial direction and are communicated to an outside of the boss part.

An aspect of the invention is the electric motor for vehicle wherein the plurality of concave parts are disposed, being aligned in a circumferential direction in one part of the inner circumferential surface of the boss part.

An aspect of the invention is the electric motor for vehicle wherein the stator support member is provided with an immersion restriction wall in a cylinder-like shape that covers an outer circumference of an end part of an opening side of the peripheral wall of the rotor, and a water drain concave part configured to drain toward outside a water drop flowed to the immersion restriction wall is provided over a scope corresponding to the water drain structure in a vertically lower area of an inner circumferential surface of the immersion restriction wall.

An aspect of the invention is the electric motor for vehicle wherein the stator support member and a base member include a water drain path configured to drain a water drop infiltrated inside toward outside, and a labyrinth structure having a foreign substance intrusion preventing part configured to prevent intrusion of a foreign substance into the water drain path is provided.

An aspect of the invention is the electric motor for vehicle wherein the water drain path includes a base side water drain path opening toward one side of the base member in the axial direction, and the foreign substance intrusion preventing part includes a rise wall that rises in a vertically upper direction from a part, facing the base side water drain path, of the stator support member, and that covers the base side water drain path from one side of the base side water drain path in the axial line direction.

An aspect of the invention is the electric motor for vehicle wherein the bearing holder further includes a flange part in a circular shape, rising from the tube part toward outside in the radial direction, and the flange part is provided with an attachment part configured to be able to adjust an attachment angle of the stator support member centering around the rotation shaft in a state in which the water drip hole is disposed on the vertically lower side of the tube part.

An aspect of the invention is the electric motor for vehicle wherein the electric motor for vehicle is used as a drive source of an electric fan for cooling a radiator for vehicle.

Advantageous Effects of Invention

According to the aspect of the invention, a water drain structure configured to drain a water drop from the water drip hole toward outside is provided along a circumferential direction of an inner circumferential surface of the boss part in a vertically lower area of the inner circumferential surface of the boss part. In this case, at the time of attaching an electric motor for vehicle to a vehicle, a quality of the water drip structure of the electric motor for vehicle is secured in a setting range of the water drain structure along the circumferential direction of the inner circumferential surface of the boss part even in a case in which the attachment angle centering around the rotation shaft of the electric motor for vehicle to a vehicle is adjusted with respect to the vehicle. Also, in the setting range of the water drain structure along the circumferential direction of the inner circumferential surface of the boss part, the attachment angle centering around the rotation shaft of the electric motor for vehicle is possible to adjust with respect to the vehicle at a predetermined angle. Accordingly, it is possible to enhance the layout characteristic at a time of attaching the electric motor for vehicle to the vehicle without diminishing the quality of the water drain structure. In addition, it is possible to enhance the connecting operability with an external connector of the vehicle.

According to the aspect of the invention, the water drain structure is a plurality of concave parts recessed from the inner circumferential surface of the boss part toward outside in a radial direction and are communicated to an outside of the boss part. In this case, at the time of attaching an electric motor for vehicle to a vehicle, even in a case in which the attachment angle centering around the rotation shaft of the electric motor for vehicle to a vehicle is adjusted with respect to the vehicle, it is possible to drain water toward outside smoothly from each concave part. Also, in comparison with a case in which a single concave part continuous in the circumferential direction of the inner circumferential surface of the boss part is provided, it is possible to enhance support strength by the boss part of the tube part. Therefore, it is possible to support the bearing holder stably.

According to the aspect of the invention, the plurality of concave parts are disposed, being aligned in a circumferential direction in one part of the inner circumferential surface of the boss part. In this case, it is satisfactory to form the water drip hole formed in the tube part only in a scope corresponding to the disposition (one part of the tube part in the vertically lower side of the tube part), it is not necessary to form excessive water drip holes. In this way, it is easier to secure roundness of the tube part, and possible to enhance processing precision of the bearing holder.

According to the aspect of the invention, a water drain concave part configured to drain toward outside a water drop flowed to the immersion restriction wall is provided over a scope corresponding to the water drain structure in a vertically lower area of an inner circumferential surface of the immersion restriction wall. In this case, at the time of attaching an electric motor for vehicle to a vehicle, a quality of the water drain concave part is secured in the setting range of the water drain structure along the circumferential direction of the inner circumferential surface of the boss part even in a case in which the attachment angle centering around the rotation shaft of the electric motor for vehicle to a vehicle is adjusted with respect to the vehicle.

According to the aspect of the invention, a labyrinth structure having a foreign substance intrusion preventing part configured to prevent intrusion of a foreign substance into the water drain path is provided. In this case, it is possible to prevent a foreign substance from intruding into the water drain path and to prevent a clog in the water drain path, therefore, it is possible to smoothly drain water through the water drain path.

According to the aspect of the invention, the foreign substance intrusion preventing part includes a rise wall that rises in a vertically upper direction from a part, facing the base side water drain path, of the stator support member, and that covers the base side water drain path from one side of the base side water drain path in the axial line direction. In this case, it is possible to prevent a foreign substance from intruding into the base side water drain path and to prevent a clog in the base side water drain path, therefore, it is possible to smoothly drain water through the base side water drain path.

According to the aspect of the invention, the flange part of the bearing holder is provided with an attachment part configured to be able to adjust an attachment angle of the stator support member centering around the rotation shaft in a state in which the water drip hole is disposed on the vertically lower side of the tube part. In this case, it is possible to attach the bearing holder to the stator support member without forming more water drip holes. In this way, it is easier to secure roundness of the tube part, and possible to enhance processing precision of the bearing holder.

According to the aspect of the invention, the electric motor for vehicle is used as a drive source of an electric fan for cooling a radiator for vehicle. In this case, it is possible to make the water drain structure effective.

DESCRIPTION OF EMBODIMENT

Hereinafter, an aspect of an embodiment of the present invention will be described with reference to the drawings.
<Entire Electric Motor>

Figure 1:
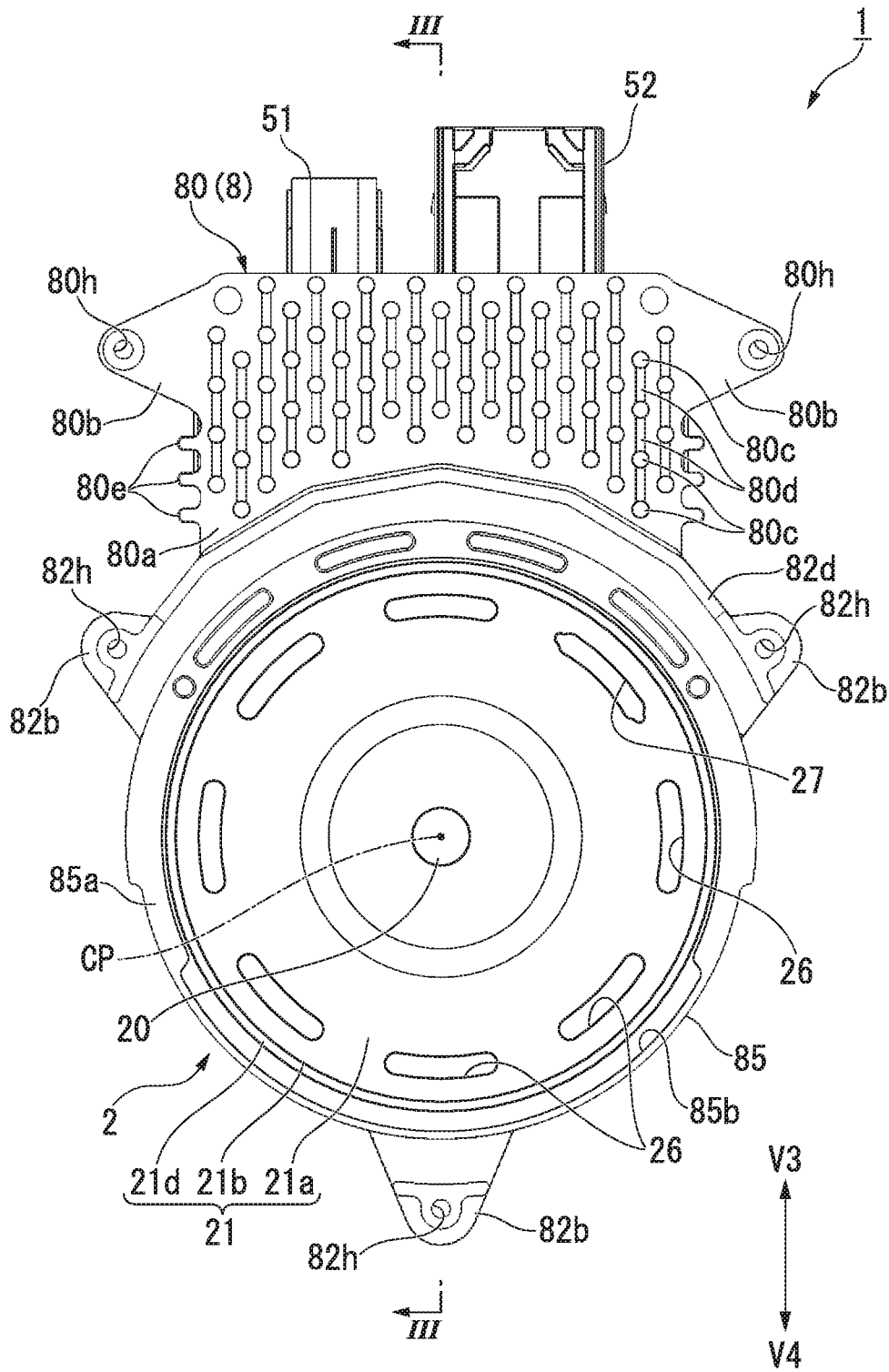
FIG. 1 is a diagram showing an electric motor of an aspect of an embodiment of the present invention seen from one side of a motor axial direction.
Figure 2:
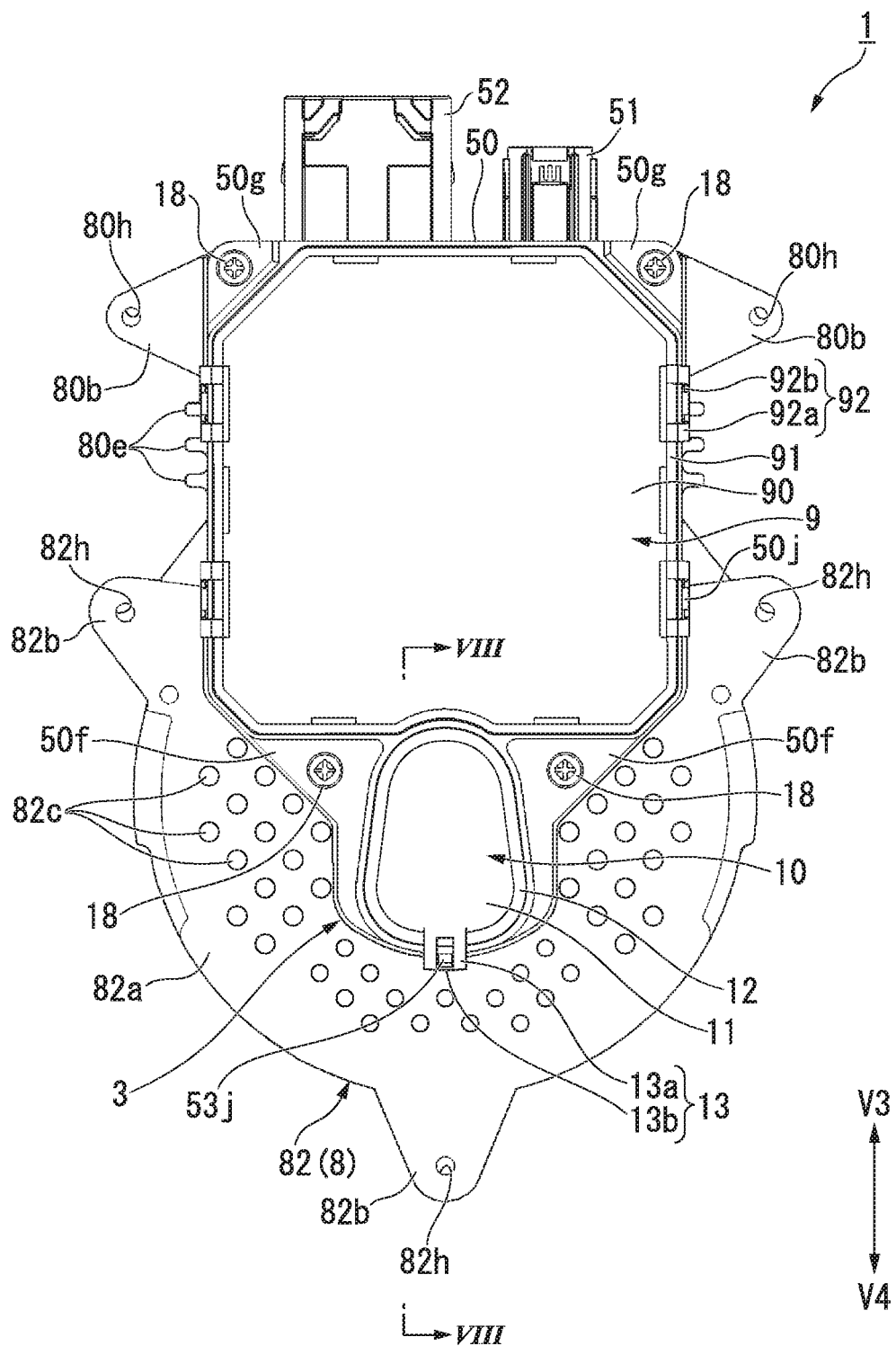
FIG. 2 is a diagram showing the electric motor from the other side of the motor axial direction.
Figure 3:
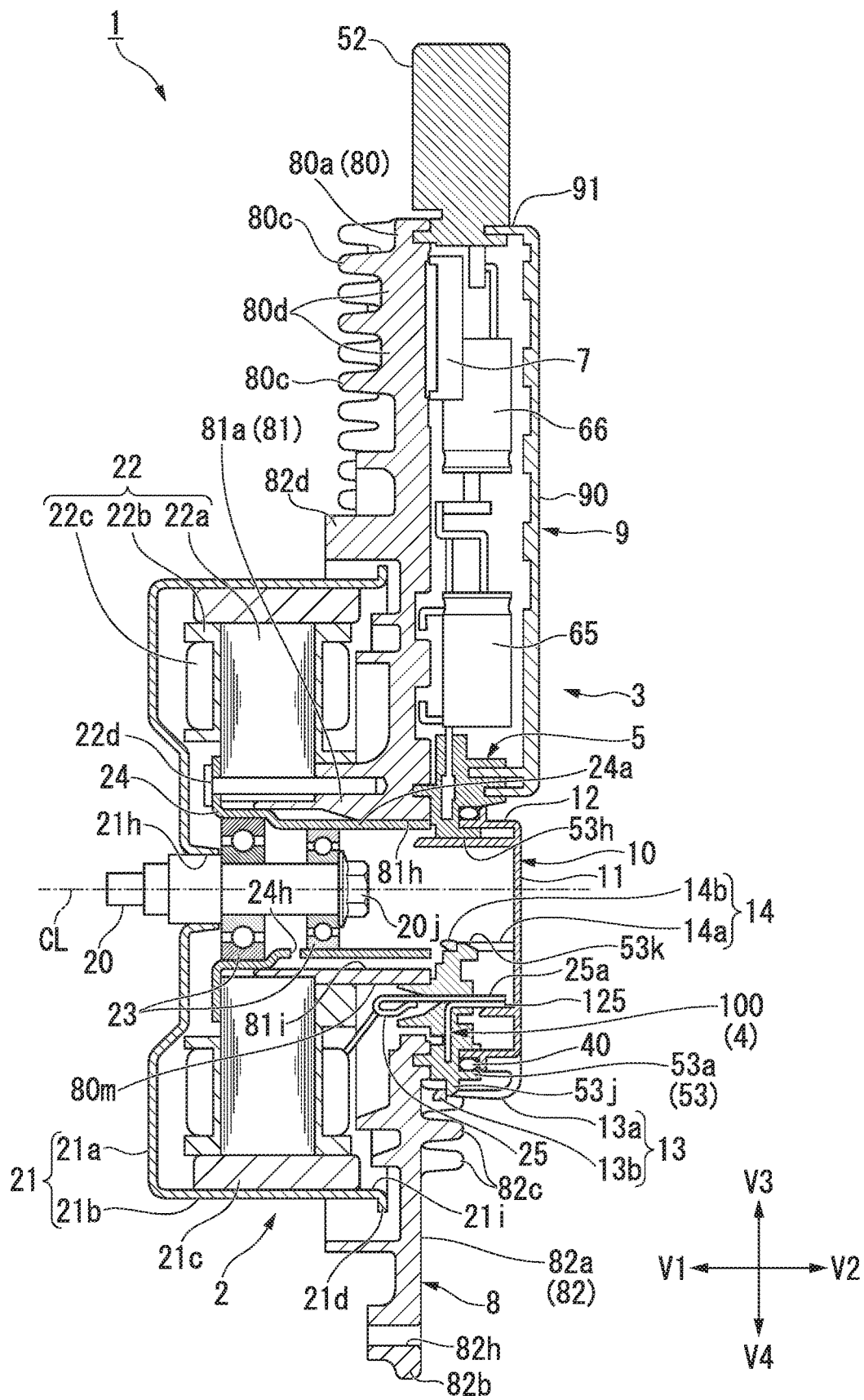
FIG. 3 is a cut view along a line in the FIG. 1.

The FIGS. 1 to 3 show an example of an electric motor 1 (an electric motor for vehicle) of the embodiment. In addition, a reference numeral CP in the drawings indicates a center of an output shaft 20 (a rotation shaft) of a brushless motor 2. Also, a reference numeral CL in the drawings indicates an axial line of the output shaft 20. Hereinafter, the center of the output shaft 20 is referred to as "motor center", a direction along the axial line CL is referred to as "motor axial direction", and a direction orthogonal to the axial line CL is referred to as "motor radial direction", a direction around the axial line CL is referred to as "motor circumferential direction". In this point, the motor axial direction corresponds with an axial direction in the claims.

Also, a reference numeral V1 in the drawings indicates one side of the motor axial direction, while a reference numeral V2 indicates the other side of the motor axial direction respectively. Also, a reference numeral V3 in the drawings indicates an upper side in the vertical direction (vertically upper side), while a reference numeral V4 indicates a lower side in the vertical direction (vertically lower side) respectively.

The electric motor 1 includes a brushless motor 2 (a driven body) and a controller 3 configured to control the brushless motor 2. The electric motor 1 is used, for example, as a drive source of an electric fan for cooling a radiator for vehicle, and is installed, being fixed, to a vehicle side via flange parts 80b and 82b so that a fan main body (not shown) fixed to the output shaft 20 to be described later faces a radiator (not shown) of the vehicle.
<Brushless Motor>

Hereinafter, description will be made with reference to the FIG. 1 and the FIG. 3. The brushless motor 2 includes the output shaft 20 extending in a horizontal direction and in a front and rear direction of a vehicle and forming the axial line CL, a rotor 21 that is rotatable together with the output shaft 20, a stator 22 that is capable of generating a magnet field to rotate the rotor 21 together with the output shaft 20.

The rotor 21 includes a bottom wall 21a of a disc-like shape that covers one side V1 of the stator 22 in the motor axial direction, a peripheral wall 21b of a cylinder-like shape that rises from an outer circumferential end of the bottom wall 21a and covers an outer circumferential side of the stator 22, forming an opening part 21i in the other side V2 of the stator 22 in the motor axial direction and an anchor part 21d of a circular ring-like shape that rises from an end part of a side of the opening part 21i of the peripheral wall 21b toward an outer side in the radial direction. In a center part of the bottom wall 21a in the radial direction, a boss part 21h of a cylinder-like shape that penetrates through the output shaft 20.

The bottom wall 21a is configured to be integrally-rotatably combined with the output shaft 20. For example, by press-fitting the output shaft 20 into the boss part 21h, the rotor 21 is configured to be rotatable together with the output shaft 20. in an inner surface in the radial direction of the peripheral wall 21b, a plural number of magnets are provided by an adhesive agent or the like. The rotor 21 is configured to be rotatable together with the output shaft 20 by receiving the magnet field that the stator 22 generates.

The stator 22 is disposed in an inner side in the radial direction of the peripheral wall 21b of the rotor 21. The stator 22 is fixed to a bracket 8 (a stator support member) by a bolt 22d. In an inner side in the radial direction of the stator 22, a bearing holder 24 configured to fit in a pair of bearings 23 that function as bearings of the output shaft 20. The bearing holder 24 is fixed together with the stator 22 by the bolt 22d.

The stator 22 includes a stator core 22a of a cylinder-like shape, an insulator 22b of insulation properties attached to both sides in the motor axial direction of a plural number of teeth parts installed in a protruding manner toward the outer side in the radial direction, and a coil 22c of conductive properties wound over the insulator 22. The coil 22c corresponds to 3 phases of U-phase, V-phase and W-phase. The brushless motor 2 of the present embodiment is a 3 phase brushless motor including the coil 22c of 3 phases of U-phase, V-phase and W-phase.

A terminal part of the coil 22c is pulled out from the opening part 21i side of the rotor 21 and is connected to a bus bar unit 25 that is disposed in the opening part 21i side so as to penetrate through an opening 80m of the bracket 8. The bus bar unit 25 has a function to supply an electric power from outside to the coil 22c. For example, the bus bar unit 25 includes a bus bar for the U-phase, a bus bar for the V-phase and a bus bar for the W-phase, that is connected to starting ends of winding (not shown) of each phase of the coil 22c (hereinafter referred to as "bus bars for the U to W-phase") and also includes a bas bar for a neutral point, that is connected to terminating ends of winding (not shown) of each phase of the coil 22c. Among the bas bars, the bus bars for the U to W-phase include three electricity supply terminals 25a extending along the motor axial direction toward a controller 3 from the opening part 21i. Each of the electricity supply terminals 25a is electrically connected to a motor side end part 125 of a three phase bus bar fixedly disposed to a base member 5 by resistance welding or the like.
<Controller>

The controller 3 includes a terminal 4 containing a plural number of bus bars 100, the base member 5 made of resin to which the terminal 4 is fixedly disposed, a plural number of electrical elements 65 and 66 electrically connected to each of the plural number of bus bar 100, a power device 7 configured to supply electricity to the brushless motor 2 and control a drive of the brushless motor 2, the bracket 8 mounted to the base member 5 and covers 9 and 10 (a main body cover 9 and a terminal cover 10) those cover the base member 5. In the base member 5, a control circuit for controlling the brushless motor 2 is configured.
<Base Member>

Hereinafter, description will be made with reference to the FIG. 2 and the FIG. 3. The base member 5 includes a base main body 50 having a width in the motor axial direction and being in a rectangular board-like shape in a plan view seen from the motor axial direction. The base member 5 includes a first connector 51 and a second connector 52, in the plan view, projecting from the base main body 50 toward the vertically upper side V3 and a terminal connection part 53 projecting from the base main body 50 toward the vertically lower side V4. For example, the plural number of bus bars 100 are fixedly disposed inside the base member 5 by insert molding using insulating material such as resin or the like.

In a facing position to the output shaft 20 in the terminal connection part 53, an opening part 53h opening (penetrating through) in a width direction of the base member 5 is formed.

Between the base main body 50 and the terminal connection part 53, a flange part 50f extending along an inclined angle part (a tapered part) in the vertically lower side V4 in the plan view and having an outline extending along an outer circumferential part of the terminal connection part 53 is formed.

In an angle part in the vertically upper side V3 of the base main body 50, a flange part 50g of a triangle-like shape having a rounded corner in a top part in the plan view is formed.

In the flange part 50f and the flange part 50g, through holes, not shown in the drawings, opening (penetrating through) in the width direction of the base member 5 are formed. For example, it is possible to fasten to fix the base member 5 to the bracket 8 by having a bolt 18 penetrate through the through holes of each of the flange 50f and the flange 50g and screwing the bolt 18 in each of attachment holes (not shown) of the bracket 8.

<Bracket>

Hereinafter, description will be made with reference to the FIG. 1 and the FIG. 3. the bracket 8 includes a bracket main body 80 in a shape formed along an outer shape of the base main body 50 in the motor axial direction, a bearing holder insertion part 81 in a shape formed along an outer shape of the terminal connection part 53 and a motor bracket part 82 in a shape formed along an outer shape of the brushless motor 2. For example, the bracket 8 is formed of such metal material of high heat conductivity as aluminum or the like.

<Bracket Main Body>

The bracket main body 80 includes a main body base part 80a (refer to the FIG. 3) having a flat surface in the other side V2 in the motor axial direction, a plural number of flange parts 80b (refer to the FIG. 1) projecting from both end parts of the main body base part 80a in the width direction toward outside in the width direction (for example, one at each end part in the both ends, two in total, in the present embodiment), a plural number of pin-like shape radiation fins 80c (refer to the FIG. 3) on a surface of the main body base part 80 projecting toward the one side V1 in the motor axial direction, a linkage rib 80d (refer to the FIG. 3) extending in a linear-like manner so as to link between the plural number of radiation fins 80c adjoining each other in the vertical direction and a plural number of convex-shaped radiation fins 80e (refer to the FIG. 1) projecting from both end parts of the main body base part 80a in the width direction. In the flange part 80b, a through hole 80h opening in the motor axial direction is formed.

<Bearing Holder Insertion Part>

In the bearing holder insertion part 81, an opening part 81h opening in the motor axial direction is formed. A bearing holder insertion boss part 81a (boss part) in a cylinder-like shape, into which a cylinder part 24a of the bearing holder 24 is configured to be inserted, is provided at a portion facing the opening part 81h (refer to the FIG. 3) in the bearing holder insertion part 81. The bearing holder insertion boss part 81a is configured to function as a motor linkage boss part, to which the brushless motor 2 is integrally linked.

<Motor Bracket Part>

A motor bracket part 82 includes a base part 82a (refer to the FIG. 3) having a flat surface in the other side V2 in the motor axial direction, a plural number (three, for example, in the present embodiment) of flange parts 82b projecting from an outer circumferential part of the base part 82a toward outside in the motor axial direction, a plural number of pin-like shape radiation fins 82c (refer to the FIG. 3) on a surface of the base part 80 projecting toward the other side V2 in the motor axial direction. In the flange part 82b, a through hole 82h opening in the motor axial direction is formed.

For example, it is possible to fasten to fix the electric motor 1 to a vehicle not shown in drawings by penetrating through bolts not shown in drawings into the through hole 80h and the through hole 82h respectively of the flange part 80b and flange part 82b of the bracket 8 and by screwing the bolt (not shown in the drawings) into attachment holes (not shown in the drawings) in the vehicle side, respectively. In addition, an attachment posture, more specifically, an attachment angle of the electric motor 1 with respect to the vehicle centering around the output shaft 20 is configured to be adjustable at a predetermined angle.

<Main Body Cover>

Hereinafter, description will be made with reference to the FIG. 2 and the FIG. 3. Seen from the other side V2 in the motor axial direction, the main body cover 9 is in a rectangular-like shape formed along an outer shape of the base main body 50. The main body cover 9 includes a ceiling part 90 covering the base main body 50 and a cover wall part 91 rising from the ceiling part 90 toward the base main body 50. The cover wall part 91 is formed in a rectangular and circular shape, seen from the other side V2 in the motor axial direction and surrounds the base main body 50.

To the ceiling part 90, a latch part 92 (refer to the FIG. 2) configured to latch the main body cover 9 to the base main body 50 is provided. A plural number (for example, two each at the both ends in the width direction, four in total, in the present embodiment) of latch parts 92 are provided at both end parts in the width direction of the ceiling part 90.

The latch part 92 includes a pair of leg parts 92a extending from the ceiling part 90 toward the base main body 50 and a linkage part 92b for linking terminal end parts of the pair of the leg parts 92a.

In the base main body 50, a nail part 50j (refer to the FIG. 2) configured to latch the linkage part 92b is provided. A plural number (for example, two each at the both ends in the width direction, 4 in total, in the present embodiment) of nail parts 50j are provided at both end parts in the width direction of the base main body 50 so as to face the latch part 92 of the main body cover 9.

<Terminal Cover>

Seen from the other side V2 in the motor axial direction, the terminal cover 10 is in a shape formed along an outer shape of the terminal connection part 53. The terminal cover 10 is disposed in a position to cover a motor side end part 125 of the three phase bus bar fixedly disposed to the base member 5 and also to cover a fastening part 20j of the output shaft 20. Accordingly, the terminal cover 10 covers an electrical connection part between three of the electricity supply terminals 25a of the brushless motor 2 (bus bars for the U to W-phase) and corresponding motor side end part 125. Between the terminal connection part 53 and the terminal cover 10, a seal material 40 in a ring-like shape is provided.

The terminal cover 10 includes a ceiling part 11 covering the terminal connection part 53 and a cover wall part 12 rising from the ceiling part 11 toward the terminal connection part 53. The cover wall part 12 includes a cover wall part 12, surrounding the terminal connection part 53, in a ring-like shape seen from the other side V2 in the motor axial direction. The terminal connection part 53 includes a base wall part 53a in a ring-like shape in contact with an outer circumference side of the cover wall part 12 via the a seal material 40.

<Bearing Holder>

Figure 4:
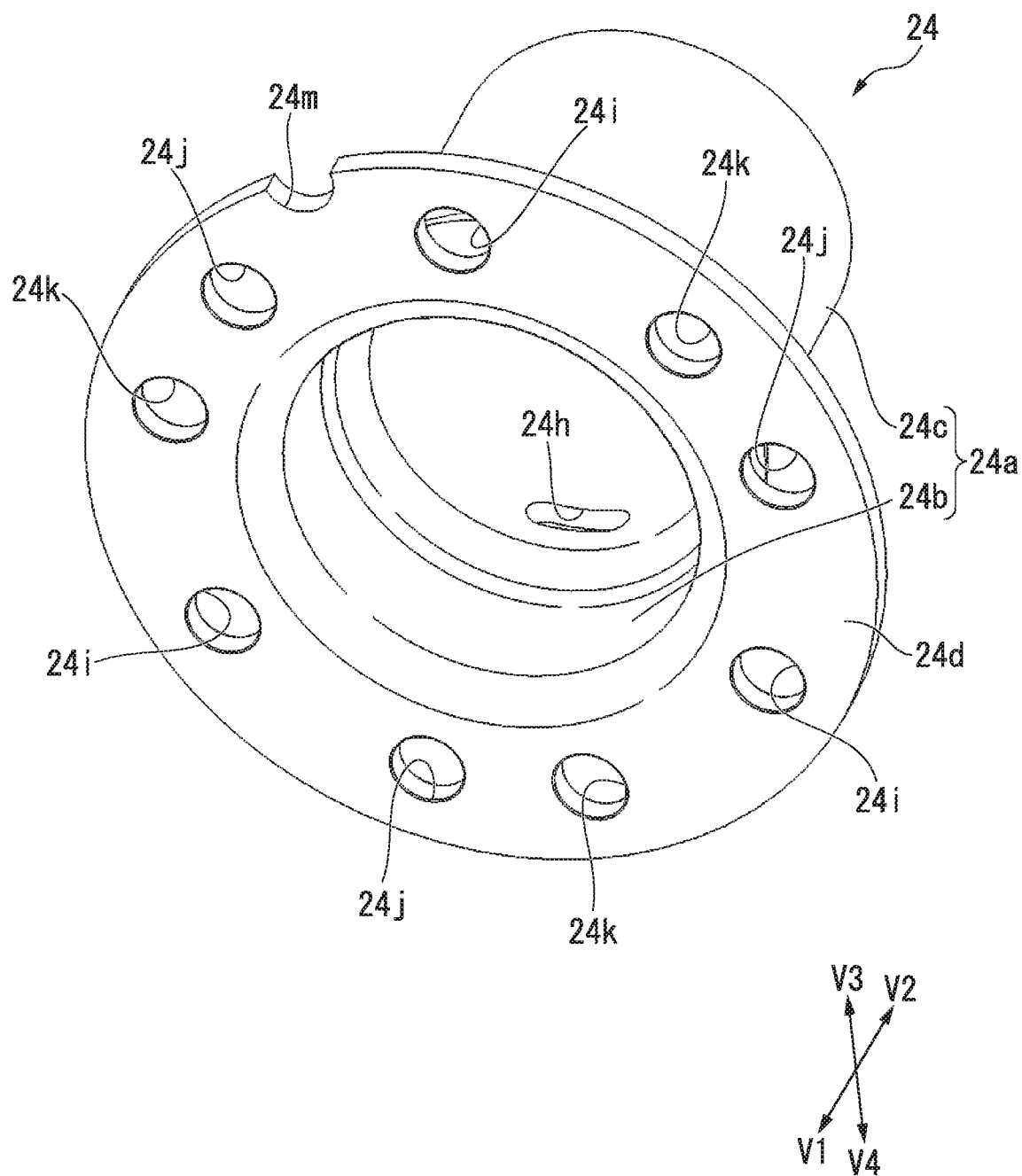
FIG. 4 is a perspective view showing a bearing holder of the electric motor.

Hereinafter, description will be made with reference to the FIG. 2, the FIG. 3 and the FIG. 4. The bearing holder 24 includes a cylinder part 24a in a cylinder-like shape supporting a pair of the bearings 23 in an inner circumference side and a flange part 24d in a circular ring-like shape that rises from an end part in the one side V1 in the motor axial direction of the cylinder part 24a toward the outer side in the radial direction. The cylinder part 24a includes a first cylinder part 24b in a cylinder-like shape configured to support one bearing in the one side V1 in the motor axial direction among the pair of the bearings 23 and a second cylinder part 24c, forming a cylinder-like shape with a shrunken diameter compared to that of the first cylinder part 24b, configured to support another bearing the other side V2 in the motor axial direction among the pair of the bearings 23. In a portion of the second cylinder part 24c that is in the vertically lower side V4 and close to the first cylinder part 24b, a water drip hole 24h is formed, that opens (penetrates through) in a thickness direction of the second cylinder part 24c and is in a long hole-like shape formed along a circumferential direction of an inner circumferential surface of the second cylinder part 24c.

In the flange part 24d, a through hole 24i, a through hole 24j and a through hole 24k, those are in a circle shape seen from the motor axial direction and open (penetrate through) in the thickness direction of the second cylinder part 24c, are formed. At this point, the through holes correspond to an example of "an attachment part" described in the claim. In addition, the reference numeral 24m in the drawings indicates a notch part formed in the flange part 24d.

A plural number (for example, three for each, nine in total, in the present embodiment) of the through hole 24i, the through hole 24j and the through hole 24k are provided. The through hole 24i, the through hole 24j and the through hole 24k are disposed in a center part in the motor radial direction along a motor circumferential direction, being spaced with predetermined intervals. Seen from the motor axial direction, the through hole 24i, the through hole 24j and the through hole 24k are respectively disposed, being spaced with approximately equal intervals in the motor circumferential direction (for example, an interval of the extent of 120 degree).

Seen from the motor axial direction, the through hole 24j and the through hole 24k are respectively disposed, being spaced with predetermined intervals (for example, intervals of the extent of 45 degree) with respect to the through hole 24i in the motor circumferential direction. In the FIG. 5, reference numerals H1, H2 and H3 respectively indicate linear lines passing through a center in the motor CP and respectively a center P1 of the through hole 24i, a center P2 of the through hole 24j and a center P3 of the through hole 24k. Also, a reference numeral θ1 indicates an angle formed by the linear line H1 and the linear line H2, and a reference numeral θ2 indicates an angle formed by the linear line H1 and the linear line H3. In addition, the angle θ1 and the angle θ2 respectively correspond to a disposition angle of the through hole 24j and a disposition angle of the through hole 24k with respect to the through hole 24i, and the angle θ1 and the angle θ2 are of the extent of 45 degree in the present embodiment. In a state in which the water drip hole 24h is disposed on the vertically lower side of the cylinder part 24a, each of the through hole 24i, the through hole 24j and the through hole 24k makes an attachment angle of the bracket 8 adjustable with respect to the center in the motor CP. In the present embodiment, the attachment angle of the bracket 8 is configured to be adjustable by an angle A1 and by an angle A2 as indicated in the FIG. 6 (45 degree toward one side and 45 degree toward the other side respectively with a center line in a bracket width direction CP as a reference) with respect to the center in the motor CP.

<Attachment Structure of Bearing Holder>

Figure 6:
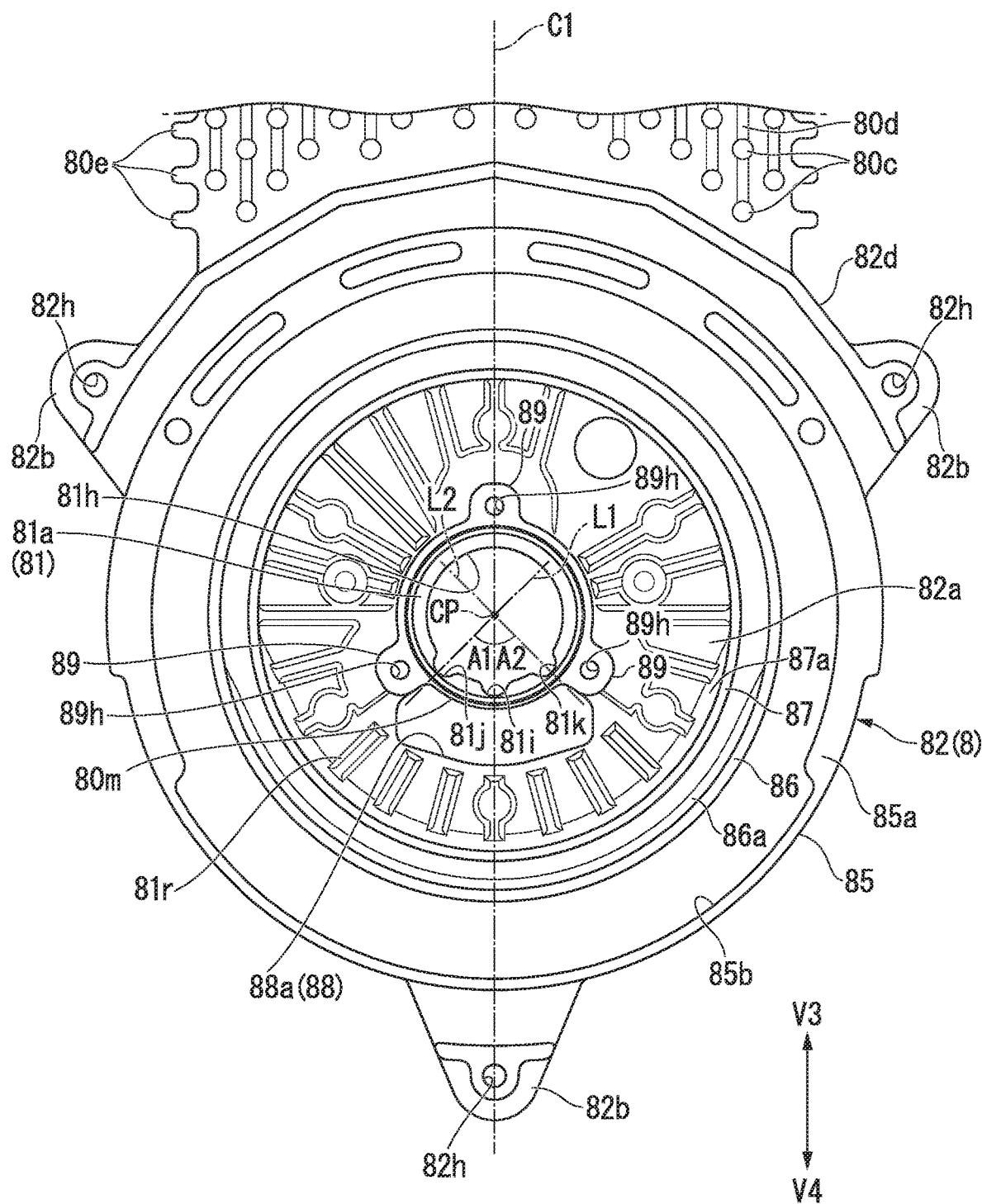
FIG. 6 is a diagram showing a main section of a bracket in the electric motor seen from the one side of the motor axial direction.

With reference to the FIG. 6 also, seen from the one side V1 in the motor axial direction, the bearing holder insertion part 81 is provided with a plural number (three in the present embodiment) of bearing holder attachment parts 89 projecting from an outer circumference part of the bearing holder insertion part 81 toward outside in the motor radial direction. Each of the bearing holder attachment parts 89 are respectively disposed, being spaced with approximately equal intervals in the motor circumferential direction (for example, an interval of the extent of 120 degree). In each of the bearing holder attachment parts 89, an attachment hole 89h that opens (penetrates through) toward the motor axial direction and is configured in a circle shape seen from the motor axial direction.

Figure 8:
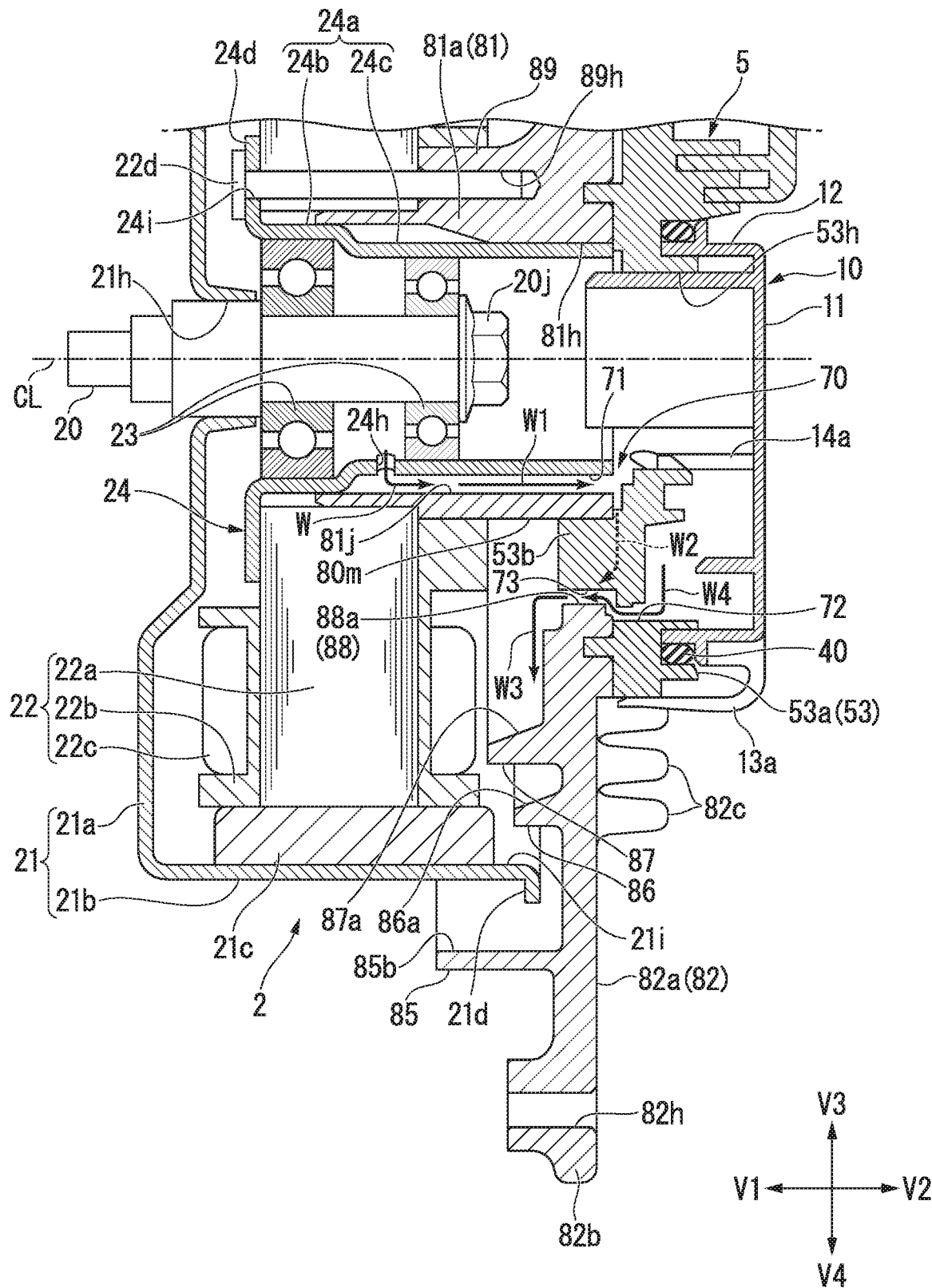
FIG. 8 is a diagram including a main section of The FIG. 3 and a cut view along VIII-VIII of The FIG. 2 for explaining a labyrinth structure provided in the bracket and a base member.

For example, it is possible to fasten to fix by fastening the bearing holder 24 together with the stator 22 to the bracket 8 by having a bolt 22d penetrate through each of the through hole 24i (or the through hole 24j, the through hole 24k) of the flange part 24d of the bearing holder 24 and screwing the bolt 22d via the stator 22 into each of the attachment hole 89h of the bearing holder attachment part 89 (refer to the FIG. 8).

<Water Drain Structure>

Figure 7:
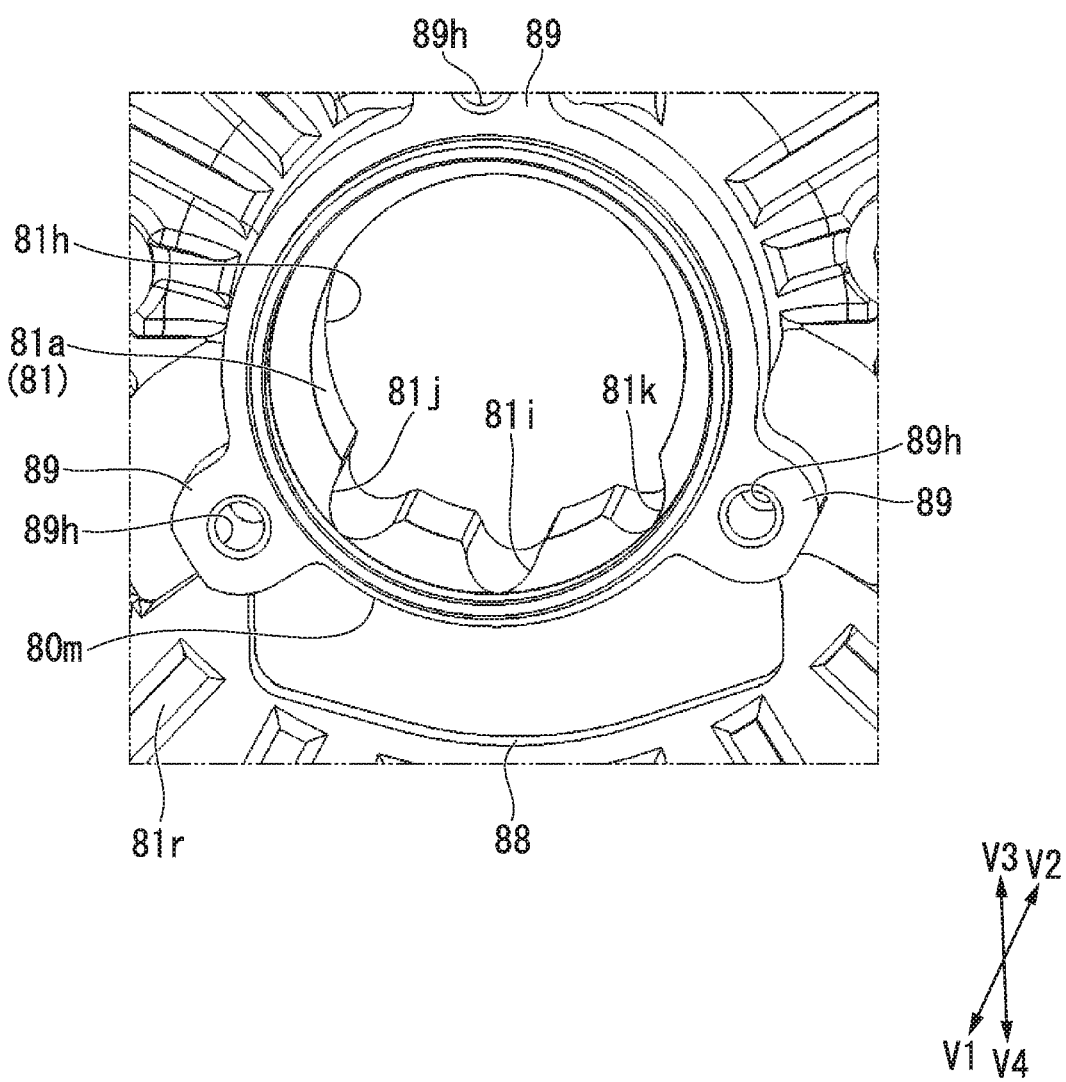
FIG. 7 is a perspective view showing a bearing holder insertion part, into which the bearing holder is inserted.

Hereinafter, description will be made with reference to the FIG. 7 and the FIG. 8. In a vertically lower area of an inner circumferential surface of the bearing holder insertion boss part 81a, a plural number (three in the present embodiment) of concave parts 81i, 81j and 81k which drain water drips from the water drip hole 24h toward outside are formed. The plural number of the concave parts 81i, 81j and 81k are disposed, aligned in a circumferential direction, in one part in an inner circumferential surface of the bearing holder insertion boss part 81a. In this point, the plurality of the concave parts corresponds to an example of "a water drain structure" in the claims.

In a case in which the electric motor 1 is used as a drive source of an electric fan for cooling a radiator for a vehicle, the electric motor 1 is likely to be disposed in an engine room at vehicle front, which is a site in an environment of undergoing water by rain water blown in or poured from traveling wheels. That is why, effective water drain structure is desired in the electric motor 1.

Each of the concave parts 81i, 81j and 81k are recessed in a U-shape seen from the motor axial direction from an inner circumferential surface of the bearing holder insertion boss part 81a toward the outer side in the radial direction. Each of the concave parts 81i, 81 j and 81k extends along the motor axial direction and, in a site facing the second cylinder part 24c, are communicated to an outside (opening in the other side V2 in the motor axial direction) of the bearing holder insertion boss part 81a. In this way, even in a case in which a water drop infiltrates inside the bearing holder 24 by rain water blown in or water poured from traveling wheels, it is possible to drain the water drop from the water drip hole 24h through each of the concave parts 81i, 81j and 81k toward outside.

Hereinafter, description will be made also with reference to the FIG. 6. A linear line passing the center in the motor CP and also passing a center of the bracket 8 in the width direction is referred to as "a center line in the bracket width direction". A reference numeral C1 in the drawings indicates the center line in the bracket width direction. Seen from the motor axial direction, the concave part 81*i* is disposed so that a bottom part (the deepest portion) of the concave part 81*i* is positioned in the center line in the bracket width direction CP. Seen from the motor axial direction, each of the concave parts 81*j* and 81*k* are disposed, being spaced with a predetermined interval (for example, an interval of the extent of 45 degree), with respect to the concave part 81*i*. In the FIG. 6, reference numerals L1 and L2 respectively indicate linear lines passing the center in the motor CP and the bottom parts (the deepest parts) of each concave part 81*j* and 81*k*. Also, the reference numeral A1 indicates an angle formed by the center line in the bracket width direction CP and the linear line L1, and the reference numeral A2 indicates an angle formed by the center line in the bracket width direction CP and the linear line L2. In addition, the angle A1 and the angle A2 respectively correspond to disposition angles of each of the concave part 81*j* and the concave part 81*k* with respect to the concave part 81*i*, and the angle A1 and the angle A2 are of the extent of 45 degree in the present embodiment.

<Flow of Drained Water According to the Attachment Angle of the Bracket>

Figure 5:
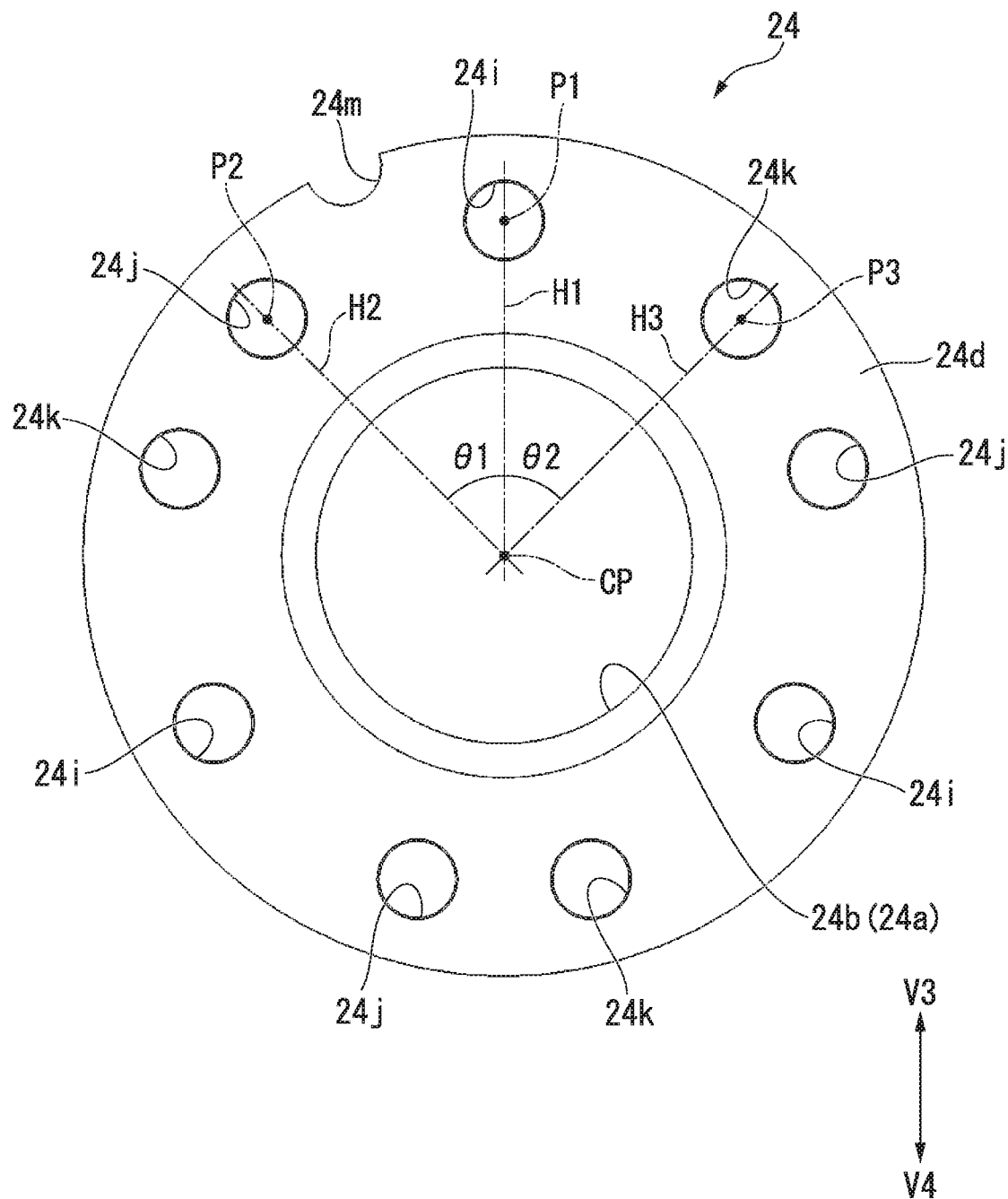
FIG. 5 is a diagram showing the bearing holder seen from the one side of the motor axial direction.

Hereinafter, description will be made with reference to the FIG. 5, the FIG. 8 and the FIG. 9. In the FIG. 9, the reference numeral W10 indicates a flow of drained water by the concave part 81*i*. By configuring a place to have the bolt 22*d* penetrate through at each of the through holes 24*i* of the flange part 24*d*, it is possible to realize a state in which the water drip hole 24*h* is disposed on the vertically lower side of the cylinder part 24*a* in a state in which the center line in the bracket width direction C1 is along the vertical direction.

Figure 9:
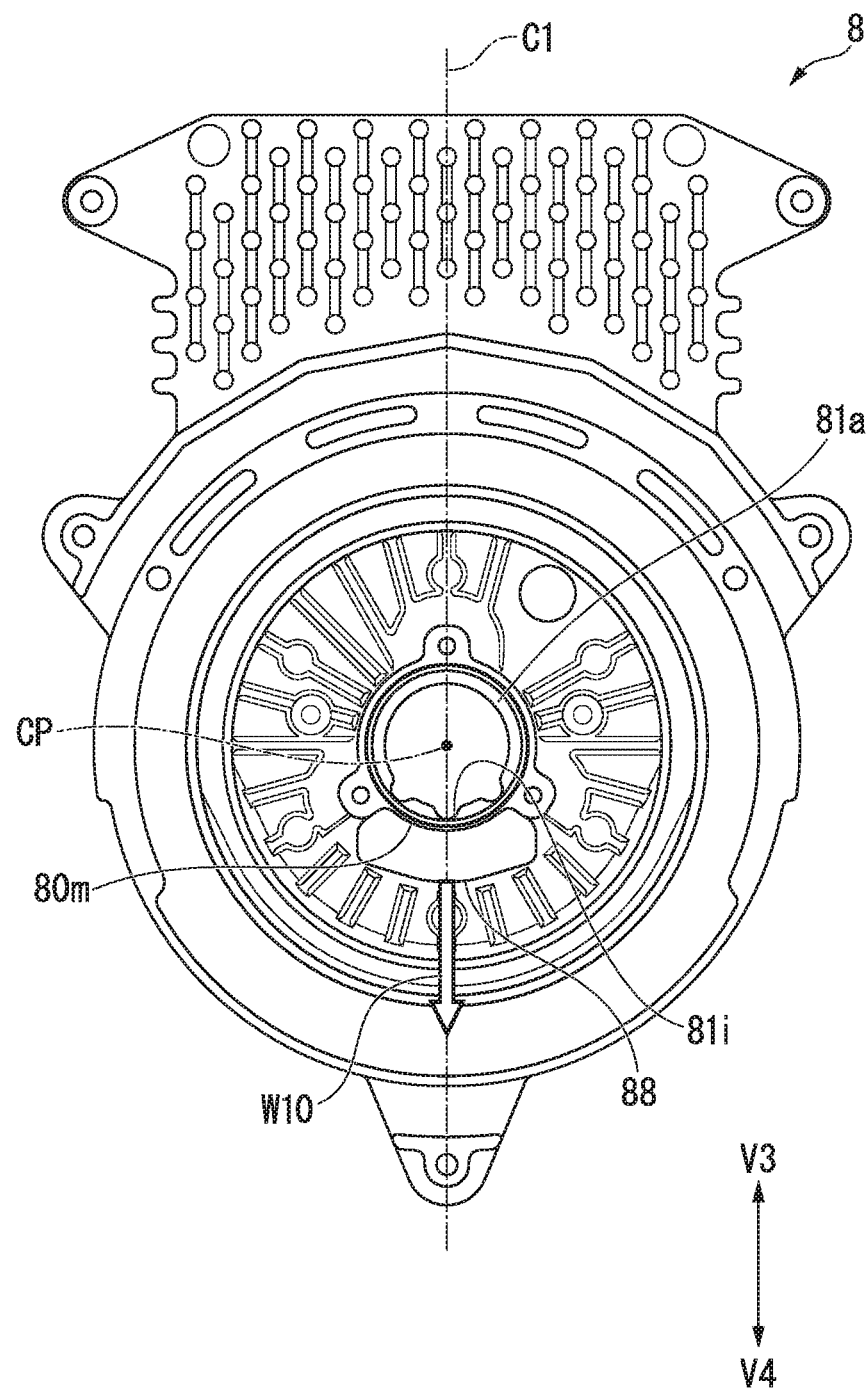
FIG. 9 is a diagram for explaining an attachment angle of the bracket, showing a status in which a center line in a width direction of the bracket is along a vertical direction.

As shown in the FIG. 9, in the state in which the center line in the bracket width direction C1 is along the vertical direction, the concave part 81*i* is disposed in the lowest part (directly under the water drip hole 24*h*) in the vertically lower side of the bearing holder insertion boss part 81*a*. In this way, it is possible to allow a water drop from the water drip hole 24*h* flow toward the vertically lower side V4 as shown by an arrow sign W10 and drain the water drop toward outside in the state in which the center line in the bracket width direction C1 is along the vertical direction.

Hereinafter, description will be made with reference to the FIG. 5, the FIG. 8 and the FIG. 10. In the FIG. 10, the reference numeral W11 indicates a flow of drained water by the concave part 81*j*. By configuring a place to have the bolt 22*d* inserted at each of the through holes 24*j* of the flange part 24*d*, it is possible to realize a state in which the water drip hole 24*h* is disposed on the vertically lower side of the cylinder part 24*a* in a state in which the center line in the bracket width direction C1 is inclined toward one side in the bracket width direction with respect to the vertical direction (for example, a state in which being inclined 45 degree toward one side with the center line in a bracket width direction CP as a reference).

Figure 10:
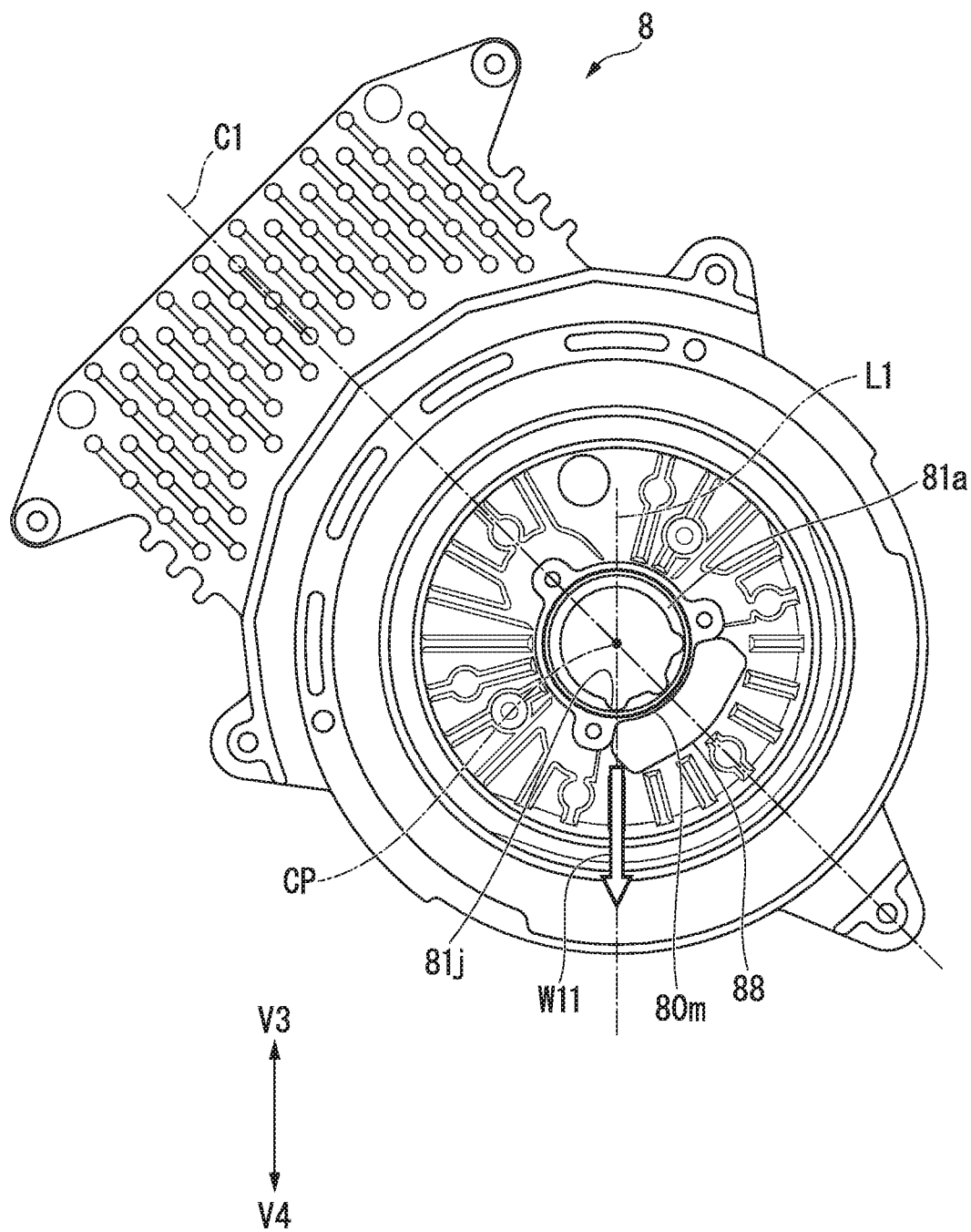
FIG. 10 is a diagram for explaining the attachment angle of the bracket, showing a status in which the center line in the width direction of the bracket is inclined to one side in the width direction of the bracket with respect to the vertical direction.

As shown in the FIG. 10, in the state in which the center line in the bracket width direction C1 is inclined toward the one side in the bracket width direction with respect to the vertical direction, the concave part 81*j* is disposed in the lowest part (directly under the water drip hole 24*h*) in the vertically lower side of the bearing holder insertion boss part 81*a*. In this way, it is possible to allow a water drop from the water drip hole 24*h* flow toward the vertically lower side V4 as shown by an arrow sign W11 and drain the water drop toward outside in the state in which the center line in the bracket width direction C1 is inclined toward the one side in the bracket width direction with respect to the vertical direction.

Hereinafter, description will be made with reference to the FIG. 5, the FIG. 8 and the FIG. 11. In the FIG. 11, the reference numeral W12 indicates a flow of drained water by the concave part 81*k*. By configuring a place to have the bolt 22*d* inserted at each of the through holes 24*k* of the flange part 24*d*, it is possible to realize a state in which the water drip hole 24*h* is disposed on the vertically lower side of the cylinder part 24*a* in a state in which the center line in the bracket width direction C1 is inclined toward the other side in the bracket width direction with respect to the vertical direction (for example, a state in which being inclined 45 degree toward the other side with the center line in a bracket width direction CP as a reference).

Figure 11:
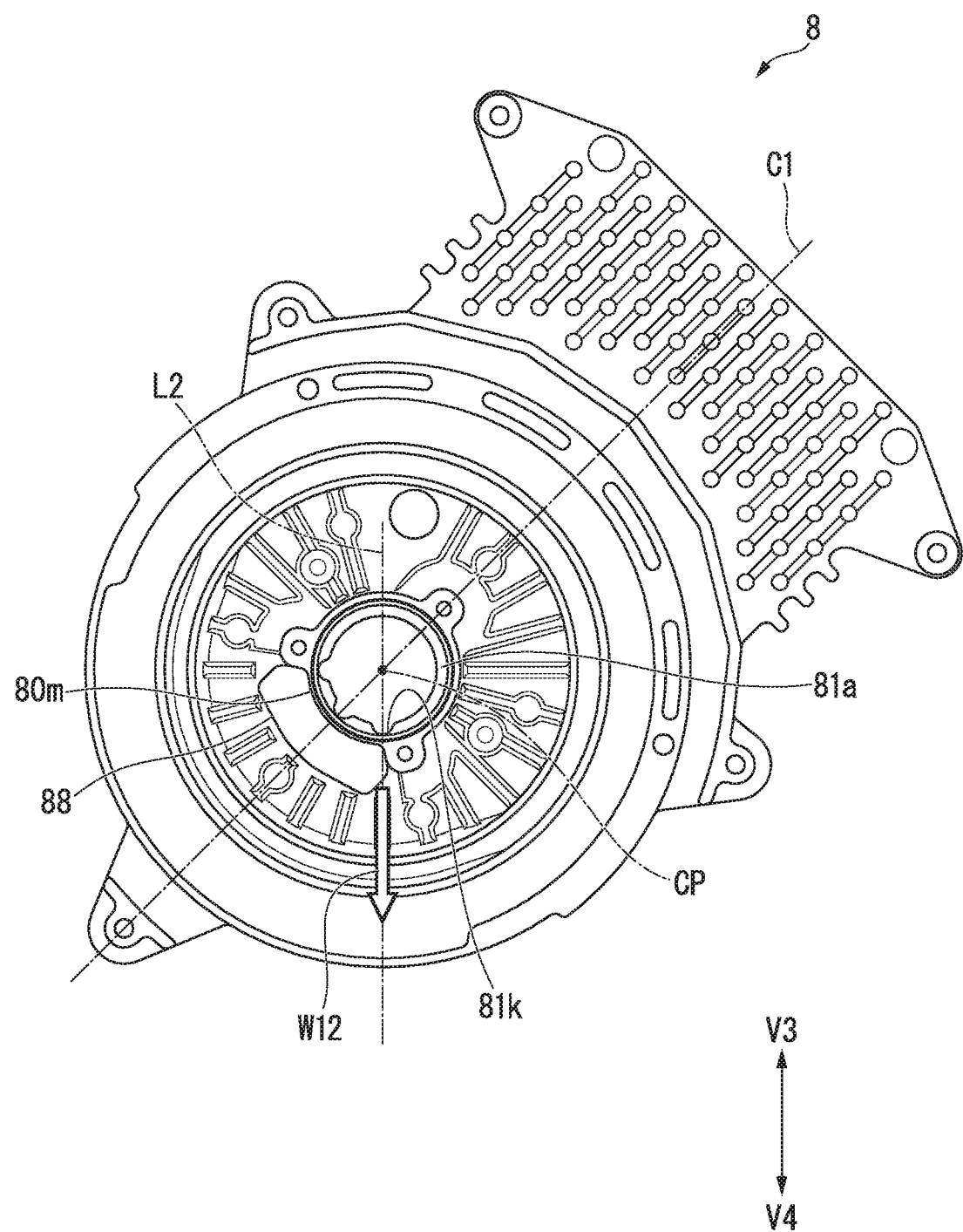
FIG. 11 is a diagram for explaining the attachment angle of the bracket, showing a status in which the center line in the width direction of the bracket is inclined to the other side in the width direction of the bracket with respect to the vertical direction.

As shown in the FIG. 11, in the state in which the center line in the bracket width direction C1 is inclined toward the other side in the bracket width direction with respect to the vertical direction, the concave part 81*k* is disposed in the lowest part (directly under the water drip hole 24*h*) in the vertically lower side of the bearing holder insertion boss part 81*a*. In this way, it is possible to allow a water drop from the water drip hole 24*h* flow toward the vertically lower side V4 as shown by an arrow sign W12 and drain the water drop toward outside in the state in which the center line in the bracket width direction C1 is inclined toward the other side in the bracket width direction with respect to the vertical direction.

<Immersion Restriction Wall>

Hereinafter, description will be made with reference to the FIG. 6 and the FIG. 8. At an outer circumferential edge of the motor bracket part 82 in the one side V1 in the motor axial direction, an immersion restriction wall 85 in a cylinder-like shape that covers an outer circumference of an end part of the opening part 21*i* side of the peripheral wall 21*b* (the anchor part 21*d*) of the rotor 21 is formed. The immersion restriction wall 85 is disposed concentrically with the bearing holder insertion boss part 81*a*.

The immersion restriction wall 85 causes a water drop, which is to immerse from the vertically upper side V3 into the center in the motor CP side where electrical connecting points and the controller 3 are disposed, fall down in drop along an outer circumferential surface toward the vertically lower side V4, and accordingly functions to restrict the immersion of the water drop toward the center in the motor CP.

In addition, the anchor part 21*d* of the rotor 21 functions as a restriction wall configured to restrict a water drop fallen down in drop on the outer circumferential surface of the peripheral wall 21*b* from flowing into the opening part 21*i* side of the peripheral wall 21*b*, and also functions as an reinforcement part for the peripheral wall 21*b*.

On the one side V1 in the motor axial direction of the motor bracket part 82, a first cylinder wall 86 configured to be in a cylinder-like shape of a smaller diameter than that of the immersion restriction wall 85 and a second cylinder wall 87 configured to be in a cylinder-like shape of a smaller diameter than that of the first cylinder wall 86 are formed. The first cylinder wall 86 and the second cylinder wall 87 are respectively disposed concentrically with the bearing holder insertion boss part 81*a*. In an inner side in the radial direction of the first cylinder wall 86 and the second cylinder wall 87, an inclination surface 86*a* and an inclination surface 87*a*, those are as inclined toward the outer side in the radial direction as far they go toward the one side V1 in the motor axial direction, are formed.

The first cylinder wall 86 and the second cylinder wall 87, like the immersion restriction wall 85, cause a water drop, which is to immerse from the vertically upper side V4 into the center in the motor CP side where electrical connecting points and the controller 3 are disposed, fall down in drop along an outer circumferential surface toward the vertically lower side V4. Thus, the first cylinder wall 86 and the second cylinder wall 87 function to restrict the immersion of the water drop toward the center in the motor CP. In this way, immersion of a water drop into the center in the motor CP is restricted in a double or triple manner.

As shown in the FIG. 6, seen from the one side V1 in the motor axial direction, in an area which is in the one side V1 in the motor axial direction of the base part 82*a* of the motor bracket part 82 and which is surrounded by the second cylinder wall 87, a plural number of ribs 81*r* extending radially from the bearing holder insertion boss part 81*a* are formed.

<Water Drain Concave Part>

Hereinafter, description will be made with reference to the FIG. 6 and the FIG. 8. In a vertically lower area of the inner circumferential surface of the immersion restriction wall 85, a water drain concave part 85*b* configured to drain out the water drop flown to the immersion restriction wall 85 toward outside is provided over a scope corresponding to the plural number of the concave parts 81*i*, 81*j* and 81*k* (water drain structure) of the bearing holder insertion boss part 81*a*. Seen from the one side V1 in the motor axial direction, the scope of setting the water drain concave part 85*b* is configured to be a larger scope of an angle than an angle formed by the linear line L1 and the linear line L2 (to the extent of 90 degree in the present embodiment). In addition, a scope of setting of the opening 80*m* of the bracket 8 is also configured to be a larger scope of an angle than the angle formed by the linear line L1 and the linear line L2 (to the extent of 90 degree in the present embodiment).

Seen from the one side V1 in the motor axial direction, the immersion restriction wall 85 is formed to be a curved surface in a round shape for an entire area of an inner circumferential surface except for the water drain concave part 85*b*. Hereinafter, a portion having the inner circumferential surface configured to be the curved surface in the round shape, except for the water drain concave part 85*b*, in the immersion restriction wall 85 is referred to as "a general part". The water drain concave part 85*b* is formed to be recessed toward the outer side in the radial direction with respect to the general part 85*a*, and to be along a circumferential direction of the inner circumferential direction of the immersion restriction wall 85. The water drain concave part 85*b* is formed in a scope over from a root part side (V2 side in the FIG. 8) to an extending end (V1 side in the FIG. 8) of the immersion restriction wall 85, and communicates with the outside (the opening of the one side V1 in the motor axial direction).

For example, even in a case in which a water drop adheres to a corner of the root part side of the immersion restriction wall 85 within the water drain concave part 85*b* by a surface tension, and the water drop adhered is frozen to form a piece of ice, a deepness of a recession of the water drain concave part 85*b* is set at such deepness that the piece of the ice does not come to contact with the end part of the opening part 21*i* side of the peripheral wall 21*b* (the anchor part 21*d*) of the rotor 21.

Hereinafter, description will be made with reference to the FIG. 1. In a state in which the brushless motor 2 is attached to the bracket 8, the inner circumferential surface of the immersion restriction wall 85 is faced to the end part of the opening part 21*i* side of the peripheral wall 21*b* (the anchor part 21*d*) of the rotor 21 with an interval. The water drain concave part 85*b* is recessed toward the outer side in the radial direction with respect to the general part 85*a*, a width of the interval from the end part of the opening part 21*i* side of the peripheral wall 21*b* (the anchor part 21*d*) of the rotor 21 is partially enlarged along the water drain concave part 85*b*, with respect to the general part 85*a*.

<Labyrinth Structure>

Hereinafter, description will be made with reference to the FIG. 8. A water drain path 70 includes a motor side water drain path 71, a base side water drain path 72 and an opening side water drain path 73. The motor side water drain path 71 is surrounded by an outer circumferential surface of the second cylinder part 24*c* in the bearing holder 24 and by the plural number of the concave parts 81*i*, 81*j* and 81*k* of the bearing holder insertion boss part 81*a*, and extends in the motor axial direction. The base side water drain path 72 opens toward the one side V1 of the base member 5 in the axial direction. The opening side water drain path 73 projects toward the one side V1 in the motor axial direction from the base member 5 and is formed between a surface of the vertically lower side of a base side convex part 53*b* surrounded by the opening 80*m* and an upper surface of a rise wall 88*a* (a surface facing the opening 80*m*) to be described later. The water drain path 70 bends in a crank-like manner and forms a labyrinth structure.

<Foreign Substance Intrusion Preventing Part>

Hereinafter, description will be made with reference to the FIG. 6 and the FIG. 8. Above-described labyrinth structure has a foreign substance intrusion preventing part 88 configured to prevent a foreign substance from intruding into the water drain path 70. The foreign substance intrusion preventing part 88 rises toward the vertically upper side from a portion facing the base side water drain path 72 in the immersion restriction wall 85, and includes the rise wall 88*a* covering the base side water drain path 72 from the one side V1 in the motor axial direction. The rise wall 88*a* is formed in a portion of the vertically lower side in an opening-forming part which forms the opening 80*m* of the bracket 8. An upper edge of the rise wall 88*a* (an end edge in the side of the opening 80*m*) is configured to be in a mild U-shape, seen from the motor axial direction (the one side V1 in the motor axial direction).

<Flow of Drained Water according to the Labyrinth Structure>

In the FIG. 8, arrow signs W, W1, W2, W3 and W4 indicate flows of drained water. For example, a water drop fallen down in drop from the water drip hole 24*h* flows into the motor side water drain path 71 as the arrow sign W indicates. The water drop flown into the motor side water drain path 71 flows inside the motor side water drain path 71 toward the other side V2 in the motor axial direction as the arrow sign W1 indicates. The water drop flown toward the other side V2 in the motor axial direction, as the dotted-lined arrow sign W2 indicates, diverts toward a back side in a sheet page or a front side in the sheet page of the base side convex part 53*b* and flows toward the vertically lower side V4 and flows into the opening side water drain path 73.

On the other hand, a water drop infiltrated into the terminal cover 10 flows, as indicated by the arrow sign W4, through the base side water drain path 72 and flows into the opening side water drain path 73. The water drop flown into the opening side water drain path 73, as indicated by the arrow sign W3, while going along a portion in the one side V1 in the motor axial direction of the rise wall 88*a* or the like, flow toward the vertically lower side V4. And the water drop goes through such water drain guide walls as the second cylinder wall 87, the first cylinder wall 86 and the water drain concave part 85*b* of the immersion restriction wall 85, and is drained toward outside.

<Rotor Positioning Hole>

As indicated in the FIG. 1, a plural (eight, for example, in the present embodiment) number of through holes 26 and through holes 27, which open (penetrate through) in a width direction of the bottom wall 21*a* are formed in the bottom wall 21*a* of the rotor 21. The plural number of through holes 26 and through holes 27 are disposed along an outer circumference of the bottom wall 21*a* of a disc-like shape, being spaced with intervals. Seen from the motor axial direction (the one side V1 in the motor axial direction), each of the through holes 26 and through holes 27 are configured to be in a long hole-like shape that extends like an arch along an outer circumferential edge of the disk-like the bottom wall 21*a*. In this way, it is possible to aim at weight saving of the rotor 21, comparing to a case in which a shape of each of the through holes are configured to be a circle shape seen from the motor axial direction.

Among the plurality of through holes 26 and through holes 27, the through holes 26 having different shapes from those of the through holes 26 ("a different shape hole") function as positioning holes for the rotor 21. Hereinafter, a through hole that functions as a positioning hole for the rotor 21 is referred to as "a rotor positioning hole". There is only one rotor positioning hole 27 is provided. In this way, when assembling the rotor 21, it has to focus attention only to one rotor positioning hole 27. Therefore, it is possible to further prevent a mounting error, compared to a case in which a plural number (two, for example) of rotor positioning holes are provided.

Figure 12:
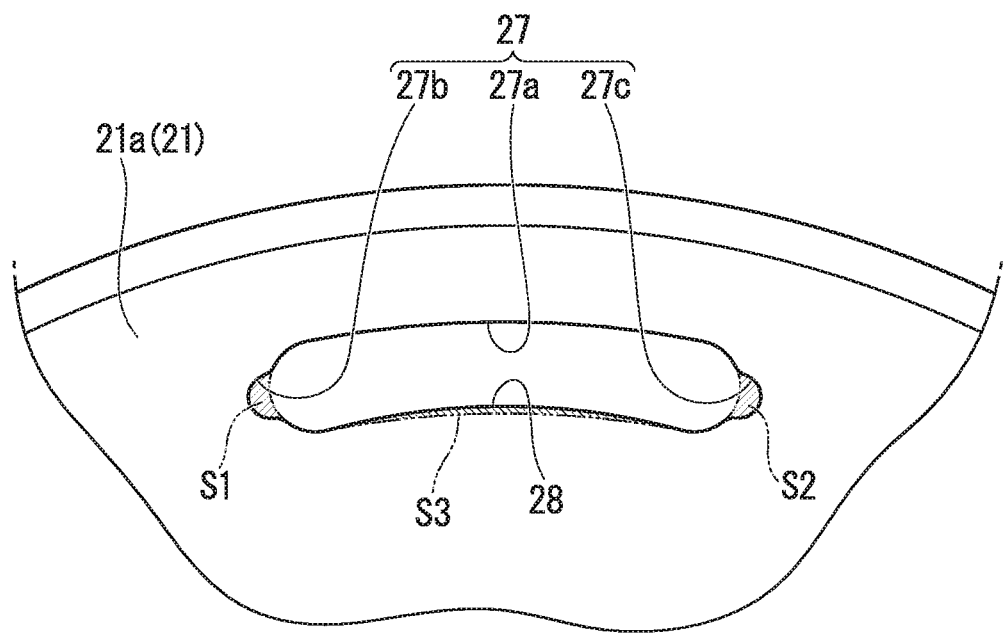
FIG. 12 is a magnified view of a main section of the FIG. 1 for explaining a rotor positioning hole in the electric motor.

As shown in the FIG. 12, the rotor positioning hole 27 includes a long hole part 27*a* that is configured to be in a long hole-like shape that extends like the arch along the outer circumferential edge of the disk-like bottom wall 21*a* seen from the motor axial direction, a first cutout part 27*b* that is formed in the one side of the motor circumferential direction of the long hole part 27*a* and a second cutout part 27*c* that is formed in the other side of the motor circumferential direction of the long hole part 27*a*. In this way, a weight balance of the rotor 21 in the motor circumferential direction is maintained, compared to a case in which a cutout part is formed only in the one side of a long hole part in the motor circumferential direction. Accordingly, it is possible to prevent noise and vibration or the like from occurring.

In an inner portion in the motor radial direction of a portion of the bottom wall 21*a* that forms the long hole part 27*a*, a thick-walled part 28 configured to be a moderate convex toward the long hole part 27*a* (outside in the motor axial direction) is formed. A reference numeral S1 in the drawing indicates a volume of a decreased amount by the first cutout part 27*b*. A reference numeral S2 in the drawing indicates a volume of a decreased amount by the second cutout part 27*c*. A reference numeral S3 in the drawing indicates a volume of an increased amount by the thick-walled part 28.

For example, the volume S3 is set to offset as much as a total amount of the decreased amount S1 and the decreased amount S2. That is to say, a weight of the thick-walled part 28 is set to offset as much weight as a weight decreased by the first cutout part 27*b* and the second cutout part 27*c*. In this way, a weight balance between the rotor positioning hole 27 and other through holes 26 is maintained, compared to a case in which only the first cutout part 27*b* and the second cutout part 27*c* are formed (a case in which the thick-walled part 28 is not formed). Accordingly, it is possible to prevent noise and vibration or the like from occurring.

As shown in the FIG. 9, the first connector 51 and the second connector 52 provided in the base member 5 project toward the vertically upper side V3 in a state in which the center line in the bracket width direction C1 is along the vertical direction. At this point, for example, in case there is a restriction of layout in the upper side of the electric motor 1, layout in a posture of the FIG. 9 is difficult, considering the installation space problem or the connecting operability with an external connector of the vehicle. However, in the present embodiment, it is possible to adjust the attachment angle of the electric motor 1 to any angle as shown in the FIG. 10 or the FIG. 11, etc. In this way, even in case there is a restriction of layout in the upper side of the electric motor 1, it is possible to layout the electric motor 1 within a restricted installation space, and it is possible to enhance the connecting operability with an external connector of the vehicle as may be necessary.

As described above, the above-described embodiment is the electric motor 1 including the stator 22 around which the coil 22*c* is wound; the bracket 8 configured to support the stator 22; the output shaft 20 rotatably supported by the bracket 8 via the bearing 23 and extends in the horizontal direction; the rotor 21 including the bottom wall 21*a* of the disc-like shape that covers one side of the stator 22 in the axial line direction of the output shaft 20 and the peripheral wall 21*b* of the cylinder-like shape that rises from the outer circumferential end of the bottom wall 21*a* and covers the outer circumferential side of the stator 22, in which the bottom wall 21*a* is configured to be integrally-rotatably combined with the output shaft 20 and the peripheral wall 21*b* is provided with a magnet 21*c*; and a bearing holder 24 including the cylinder part 24*a* of the cylinder-like shape configured to support the bearing 23 in the inner circumferential side thereof, and the water drip hole 24*h* is formed on the vertically lower side of the cylinder part 24*a*, the bracket 8 being provided with the bearing holder insertion part 81*a* including the bearing holder insertion boss part 81*a* of the cylinder-like shape into which the cylinder part 24*a* is configured to be inserted, wherein a water drain structure configured to drain a water drop from the water drip hole 24*h* toward outside is provided along the circumferential direction of the inner circumferential surface of the bearing holder insertion boss part 81*a* in the vertically lower area of the inner circumferential surface of the bearing holder insertion boss part 81*a*.

According to this configuration, a water drain structure configured to drain the water drop from the water drip hole 24*h* toward outside is provided along the circumferential direction of the inner circumferential surface of the bearing holder insertion boss part 81*a* in the vertically lower area of the inner circumferential surface of the bearing holder insertion boss part 81*a*. In this way, at the time of attaching the electric motor 1 to a vehicle, a quality of the water drip structure is secured in a setting range of the water drain structure along the circumferential direction of the inner circumferential surface of the bearing holder insertion boss part 81*a* even in a case in which the attachment angle centering around the output shaft 20 of the electric motor 1 to a vehicle is adjusted with respect to the vehicle. Also, in the setting range of the water drain structure along the circumferential direction of the inner circumferential surface of the bearing holder insertion boss part 81*a*, the attachment angle centering around the output shaft 20 of the electric motor 1 is possible to adjust with respect to the vehicle at a predetermined angle. Accordingly, it is possible to enhance the layout characteristic at a time of attaching to the vehicle without diminishing the quality of the water drain structure, and it is possible to enhance the connecting operability with an external connector of the vehicle.

According to the above-described embodiment, the water drain structure is the plural number of the concave parts 81*i*, 81*j* and 81*k* recessed from the inner circumferential surface of the bearing holder insertion boss part 81*a* toward outside in the radial direction and are communicated to the outside of the bearing holder insertion boss part 81*a*. In this way, at the time of attaching the electric motor 1 for vehicle to a vehicle, even in a case in which the attachment angle centering around the output shaft 20 of the electric motor 1 to a vehicle is adjusted with respect to the vehicle at a predetermined angle, it is possible to drain water toward outside smoothly from each of the concave parts 81*i*, 81*j* and 81*k*. Also, in comparison with a case in which a single concave part continuous in the circumferential direction of the inner circumferential surface of the bearing holder insertion boss part 81*a* is provided, it is possible to enhance support strength of the cylinder part 24*a* by the bearing holder insertion boss part 81*a*. Therefore, it is possible to support the bearing holder 24 stably.

Also, according to the above-described embodiment, the plurality of the concave parts 81*i*, 81*j* and 81*k* are disposed, being aligned in the circumferential direction in one part of the inner circumferential surface of the bearing holder insertion boss part 81*a*. In this way, it is satisfactory to form the water drip hole 24*h* formed in the cylinder part 24*a* only in the scope corresponding to the disposition (the part of the cylinder part 24*a* in the vertically lower side), it is not necessary to form excessive water drip holes. In this way, it is easier to secure roundness of the cylinder part 24*a*, and possible to enhance processing precision of the bearing holder 24.

Also, according to the above-described embodiment, the water drain concave part 85*b* configured to drain toward outside a water drop flowed to the immersion restriction wall 85 is provided over the scope corresponding to the water drain structure in the vertically lower area of the inner circumferential surface of the immersion restriction wall 85. In this way, at the time of attaching the electric motor 1 to a vehicle, a quality of the water drain concave part 85*b* is secured in the setting range of the water drain structure along the circumferential direction of the inner circumferential surface of the bearing holder insertion boss part 81*a* even in a case in which the attachment angle centering around the output shaft 20 of the electric motor 1 to a vehicle is adjusted with respect to the vehicle at a predetermined angle.

Also, according to the above-described embodiment, there is the water drain path 70 in the bracket 8 and the base member 5, and the labyrinth structure having the foreign substance intrusion preventing part 88 configured to prevent intrusion of a foreign substance into the water drain path 70 is provided. In this way, it is possible to prevent a foreign substance from intruding into the water drain path 70 and to prevent a clog in the water drain path 70, therefore, it is possible to smoothly drain water through the water drain path 70.

Also, according to the above-described embodiment, the foreign substance intrusion preventing part 88 includes the rise wall 88*a* that rises in the vertically upper direction from the part, facing the base side water drain path 72, of the bracket 8, and that covers the base side water drain path 72 from one side of the base side water drain path 72 in the motor axial direction. In this way, it is possible to prevent a foreign substance from intruding into the base side water drain path 72 and to prevent a clog in the base side water drain path 72, therefore, it is possible to smoothly drain water through the base side water drain path 72.

Also, according to the above-described embodiment, the flange part 24*d* of the bearing holder 24 is provided with the attachment part (the through hole 24*i*, the through hole 24*j* and the through hole 24*k*) configured to be able to adjust the attachment angle of the bracket 8 centering around the output shaft 20 in a state in which the water drip hole 24*h* is disposed on the vertically lower side of the cylinder part 24*a*. In this way, it is possible to attach the bearing holder 24 to the bracket 8 without forming more water drip holes 24*h*.

Also, according to the above-described embodiment, the electric motor 1 is used as the drive source of the electric fan for cooling the radiator for vehicle. In this way, it is possible to make the water drain structure effective.

In addition, the technical scope of the present invention is not limited to the above-described embodiment, and it is possible to conduct various changes without departing from the main point of the invention.

For example, in the above-described embodiment, the water drain structure is configured to be the plural number of the concave parts 81*i*, 81*j* and 81*k* recessed from the inner circumferential surface of the bearing holder insertion boss part 81*a* toward outside in the radial direction and are communicated to the outside of the bearing holder insertion boss part 81*a*. However, not limited to this, and it may be configured to be a single concave part continuous in the circumferential direction of the inner circumferential surface of the bearing holder insertion boss part 81*a*, for example.

Also, in the above-described embodiment, the number of disposing the concave parts 81*i*, 81*j* and 81*k* is configured to be three, however not limited thereto. In addition, the number of disposing each of the through hole 24*i*, the through hole 24*j* and the through hole 24*k*, and the number of disposing the bearing holder attachment parts 89 is not limited to three.

Also, in the above-described embodiment, the foreign substance intrusion preventing part 88 is configured to include the rise wall 88*a* that rises in the vertically upper direction from the part, facing the base side water drain path 72, of the bracket 8, and that covers the base side water drain path 72 from one side of the base side water drain path 72 in the motor axial direction. However, not limited thereto, and a wall part in a separated body from the bracket 8 as a foreign substance intrusion preventing part may be provided in a part facing the base side water drain path 72, for example.

Also, in the above-described embodiment, connecting between the motor side end part 125 of the three phase bus bar and each of the electricity supply terminals 25*a* is conducted by resistance welding. However, not limited thereto, and it may be conducted by an arc welding such as a TIG welding or a laser welding, or the like, for example.

Also, material or shape or the like of the base member 5, the bracket 8, the main body cover 9, the terminal cover 10, the brushless motor 2 or the bus bar 100, etc. are not limited to the above-described embodiment. For example, the bus bar 100 may be formed of aluminum. Also, the bracket 8 may be formed of metal material such as iron (carbon steel) or the like.

Also, the case in which the electric motor 1 is used as the drive source of the electric fan for cooling the radiator for vehicle, however it is not limited thereto in the above-described embodiment.

Other than above, without departing from the scope of the present invention, it is possible to arbitrarily replace elements of the above-described embodiment with known elements.

REFERENCE NUMERALS

1 ELECTRIC MOTOR (ELECTRIC MOTOR FOR VEHICLE)
2 BRUSHLESS MOTOR (MOTOR)
4 TERMINAL
5 BASE MEMBER
8 BRACKET (STATOR SUPPORT MEMBER)
20 OUTPUT SHAFT (ROTATION SHAFT)
21 ROTOR
21a BOTTOM WALL
21b PERIPHERAL WALL
21c MAGNET
22 STATOR
22c COIL
23 BEARING (BEARING)
24 BEARING HOLDER
24a CYLINDER PART
24d FLANGE PART
24h WATER DRIP HOLE
24i, 24j, 24k THROUGH HOLE (ATTACHMENT PART)
53 TERMINAL CONNECTION PART
70 WATER DRAIN PATH
72 BASE SIDE WATER DRAIN PATH
81 BEARING HOLDER INSERTION PART
81A BEARING HOLDER INSERTION BOSS PART (BOSS PART)
81I, 81J, 81K CONCAVE PARTS (WATER DRAIN STRUCTURE)
85 IMMERSION RESTRICTION WALL
85B WATER DRAIN CONCAVE PART
88 FOREIGN SUBSTANCE INTRUSION PREVENTING PART
88A RISE WALL CL AXIAL LINE OF OUTPUT SHAFT (AXIAL LINE OF ROTATION SHAFT)

The invention claimed is:

1. An electric motor for vehicle comprising:
a stator around which coil is wound;
a stator support member configured to support the stator;
a rotation shaft rotatably supported by the stator support member via an axle bearing and extends in a horizontal direction;
a rotor including a bottom wall of a disc-like shape that covers one side of the stator in an axial line direction of the rotation shaft and a peripheral wall of a cylinder-like shape that rises from an outer circumferential end of the bottom wall and covers an outer circumferential side of the stator, in which the peripheral wall is provided with a magnet and the bottom wall is configured to be integrally-rotatably combined with the rotation shaft; and
a bearing holder including a tube part of a cylinder-like shape configured to support the axle bearing in an inner circumferential side thereof, and a water drip hole is formed in a vertically lower side of the tube part, the stator support member being provided with a bearing holder insertion part including a boss part of a cylinder-like shape into which the tube part is configured to be inserted,
wherein a water drain structure configured to drain a water drop from the water drip hole toward outside is provided along a circumferential direction of an inner circumferential surface of the boss part in a vertically lower area of the inner circumferential surface of the boss part, and
the water drain structure is a plurality of concave parts recessed from the inner circumferential surface of the boss part toward outside in a radial direction and are communicated to an outside of the boss part.

2. The electric motor for vehicle according to claim 1, wherein the plurality of concave parts are disposed, being aligned in a circumferential direction in one part of the inner circumferential surface of the boss part.

3. The electric motor for vehicle according to claim 1, wherein the stator support member is provided with an immersion restriction wall in a cylinder-like shape that covers an outer circumference of an end part of an opening side of the peripheral wall of the rotor, and
a water drain concave part configured to drain toward outside a water drop flowed to the immersion restriction wall is provided over a scope corresponding to the water drain structure in a vertically lower area of an inner circumferential surface of the immersion restriction wall.

4. The electric motor for vehicle according to claim 1, wherein the bearing holder further includes a flange part in a circular shape, rising from the tube part toward outside in the radial direction, and
the flange part is provided with an attachment part configured to be able to adjust an attachment angle of the stator support member centering around the rotation shaft in a state in which the water drip hole is disposed in a vertically lower side of the tube part.

5. The electric motor for vehicle according to claim 1, wherein the electric motor for vehicle is used as a drive source of an electric fan for cooling a radiator for the vehicle.

6. The electric motor for vehicle according to claim 1, wherein the stator support member and a base member include a water drain path configured to drain a water drop infiltrated inside toward outside, and
a labyrinth structure having a foreign substance intrusion preventing part configured to prevent intrusion of a foreign substance into the water drain path is provided.

7. The electric motor for vehicle according to claim 6, wherein the water drain path includes a base side water drain path opening toward one side of the base member in the axial direction, and
the foreign substance intrusion preventing part includes a rise wall that rises in a vertically upper direction from a part, facing the base side water drain path, of the stator support member, and that covers the base side water drain path from one side of the base side water drain path in the axial line direction.

* * * * *